United States Patent
Ganguly et al.

(10) Patent No.: US 12,153,945 B2
(45) Date of Patent: Nov. 26, 2024

(54) CENTRALIZED MANAGEMENT, PROVISIONING AND MONITORING OF CLOUD INFRASTRUCTURE

(71) Applicant: Cisco Technology, Inc., San Jose, CA (US)

(72) Inventors: Chandragupta Ganguly, San Jose, CA (US); Om Prakash Suthar, Bolingbrook, IL (US); Alec Hothan, San Rafael, CA (US); Vivek Agarwal, Chelmsford, MA (US); John Wei-I Wu, San Jose, CA (US); Ajay Kalambur, Campbell, CA (US); Devendra Kumar Vishwakarma, North Chelmsford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/003,563

(22) Filed: Aug. 26, 2020

(65) Prior Publication Data
US 2021/0271506 A1 Sep. 2, 2021

Related U.S. Application Data

(60) Provisional application No. 62/982,778, filed on Feb. 28, 2020, provisional application No. 62/983,000, filed on Feb. 28, 2020.

(51) Int. Cl.
*G06F 9/455* (2018.01)
*G06F 8/61* (2018.01)
(Continued)

(52) U.S. Cl.
CPC .......... *G06F 9/45558* (2013.01); *H04L 41/04* (2013.01); *H04L 67/10* (2013.01);
(Continued)

(58) Field of Classification Search
None
See application file for complete search history.

(56) References Cited

U.S. PATENT DOCUMENTS

| 5,594,903 A | 1/1997 | Bunnell et al. |
| 9,038,083 B2 | 5/2015 | Huang et al. |

(Continued)

FOREIGN PATENT DOCUMENTS

| CN | 102857363 A | 1/2013 |
| CN | 103828300 A | 5/2014 |

(Continued)

OTHER PUBLICATIONS

Red Hat, Inc., "Red Hat Network Satellite 5.5 Reference Guide", Red Hat Network Satellite, Edition 4, Sep. 19, 2012, 251 pages.
(Continued)

*Primary Examiner* — Lewis A Bullock, Jr.
*Assistant Examiner* — Melissa A Headly
(74) *Attorney, Agent, or Firm* — Edell, Shapiro & Finnan, LLC

(57) ABSTRACT

A first virtual machine executing on a centralized management node provides a first image file to a first computing entity arranged within a first point of delivery. The first image file includes a first boot configuration file or a first ramdisk file. A second virtual machine provides a second image file to a second computing entity arranged within a second point of delivery different from the first point of delivery. The second image file includes a second boot configuration file or a second ramdisk file. The first virtual machine provides a third image file to the first computing entity. The third image file comprises a first operating system installation file. The second virtual machine provides
(Continued)

a fourth image file to the second computing entity. The fourth image file comprises a second operating system installation file.

18 Claims, 19 Drawing Sheets

(51) Int. Cl.
*H04L 41/04* (2022.01)
*H04L 67/00* (2022.01)
*H04L 67/10* (2022.01)

(52) U.S. Cl.
CPC ............... *H04L 67/34* (2013.01); *G06F 8/63* (2013.01); *G06F 2009/45575* (2013.01); *G06F 2009/45595* (2013.01)

(56) References Cited

U.S. PATENT DOCUMENTS

| | | | |
|---|---|---|---|
| 9,164,749 B2* | 10/2015 | DeHaan | G06F 8/61 |
| 9,213,568 B2 | 12/2015 | Huang et al. | |
| 9,251,115 B2 | 2/2016 | Bursell | |
| 9,276,925 B2 | 3/2016 | Huang et al. | |
| 9,363,190 B2 | 6/2016 | Beloglazov et al. | |
| 10,033,595 B2 | 7/2018 | Sif et al. | |
| 10,185,637 B2 | 1/2019 | Deng et al. | |
| 10,958,539 B1* | 3/2021 | Raj | G06F 9/45558 |
| 2010/0057890 A1* | 3/2010 | DeHaan | H04L 67/1001 709/220 |
| 2017/0063648 A1* | 3/2017 | Nadaf | G06F 9/5011 |
| 2017/0116084 A1 | 4/2017 | Liu | |
| 2017/0149880 A1 | 5/2017 | Lochhead et al. | |
| 2017/0289002 A1 | 10/2017 | Ganguli et al. | |
| 2018/0302299 A1 | 10/2018 | Sun et al. | |
| 2019/0286371 A1* | 9/2019 | Takagawa | G06F 3/0671 |

FOREIGN PATENT DOCUMENTS

| | | |
|---|---|---|
| CN | 104854562 A | 8/2015 |
| CN | 105284080 A | 1/2016 |
| CN | 109669762 A | 4/2019 |
| WO | 2014036716 A1 | 3/2014 |
| WO | 2018149701 A1 | 8/2018 |

OTHER PUBLICATIONS

Red Hat, Inc., "1.6. Security, Quality Assurance, and Red Hat Network", retrieved from Internet: Aug. 26, 2020, 58 pages.
Charley Rich et al., "Market Guide for AIOps Platforms", Gartner, Nov. 7, 2019, ID G00378587, 17 pages.
Red Hat, Inc., "Chapter 1. Deploying Distributed Compute Nodes to Edge Sites", retrieved from Internet: Aug. 26, 2020, 17 pages.
Oracle, "What's New in Oracle® Solaris 11.2", Dec. 2014, 34 pages.
International Search Report and Written Opinion in counterpart International Application No. PCT/US2021/018969, mailed Jun. 1, 2021, 17 pages.
"Intelligent Application and Service Monitoring + AIOps," Zenoss, www.zenoss.com, retrieved from the Internet Jul. 25, 2022. 7 pages.
"Federation," Prometheus, https://prometheus.io/docs/prometheus/latest/federation/, retrieved from the Internet Jul. 25, 2022, 4 pages.
Office Action in counterpart Chinese Application No. 202180013016.4, mailed Sep. 28, 2023, 18 pages.
Notice of Intention to Grant for Chinese Application No. 202180013016.4, dated Mar. 13, 2024, 9 pages.

* cited by examiner

CENTRALIZED MANAGEMENT, PROVISIONING AND MONITORING OF CLOUD INFRASTRUCTURE

CROSS REFERENCE TO RELATED APPLICATION

This application claims the benefit of U.S. Provisional Application No. 62/983,000, filed Feb. 28, 2020, and U.S. Provisional Application No. 62/982,778, filed Feb. 28, 2020, the entireties of which are incorporated herein by reference.

TECHNICAL FIELD

The present disclosure relates to the management, provisioning and monitoring of cloud infrastructure.

BACKGROUND

Open standard cloud computing platforms, such as the OpenStack® cloud management software platform, mostly provide for infrastructure-as-a-service (IaaS) in both public and private clouds where virtual servers and other resources are made available to users. Such platforms may consist of interrelated components that control diverse, multi-vendor hardware pools of processing, storage, and networking resources throughout a data center. Users may manage such implementations through a web-based dashboard, through command-line tools, or through RESTful web services.

Many mobile network operators are intending to distribute telecommunication cloud networks having thousands of remote locations for deployment of applications, such as multi-access or mobile edge computing, virtualized Radio Access Network, content delivery networks, and others, closer to the subscribers/user equipment. These locations may include remote locations that may be very small and may house small-sized datacenters.

As cloud implementations expand in size and geographical reach, challenges for provisioning and monitoring open standard cloud computing platforms may be encountered. Solutions to these challenges are needed, particularly solutions that are low cost and efficient with respect to device and power usage.

DESCRIPTION OF EXAMPLE EMBODIMENTS

Overview

According to example embodiments, centralized cloud infrastructure provisioning and management are provided. According to such example embodiments, a first virtual machine executing on a centralized management node provides a first image file to a first computing entity arranged within a first point of delivery, wherein the first image file comprises at least one of a first boot configuration file or a first ramdisk file. A second virtual machine executing on the centralized management node provides a second image file to a second computing entity arranged within a second point of delivery different from the first point of delivery. The second image file comprises at least one of a second boot configuration file or a second ramdisk file. The first virtual machine executing on the centralized management node provides a third image file to the first computing entity arranged within the first point of delivery. The third image file comprises a first operating system installation file. The second virtual machine executing on the centralized management node provides a fourth image file to the second computing entity arranged within the second point of delivery. The fourth image file comprises a second operating system installation file.

Example embodiments also provide for centralized monitoring of cloud infrastructure. According to such example embodiments, a centralized management node provides a first request to a first controller node. The first request is for obtaining first performance data from a first computing entity arranged within a first point of delivery. The centralized management node provides a second request to a second controller node. The second request is for obtaining second performance data from a second computing entity arranged within a second point of delivery different from the first point of delivery. A first response with the first performance data for the first computing entity is obtained from the first controller node. Finally, a second response with the second performance data for the second computing entity is obtained from the second controller node.

Example Embodiments

Figure 1:
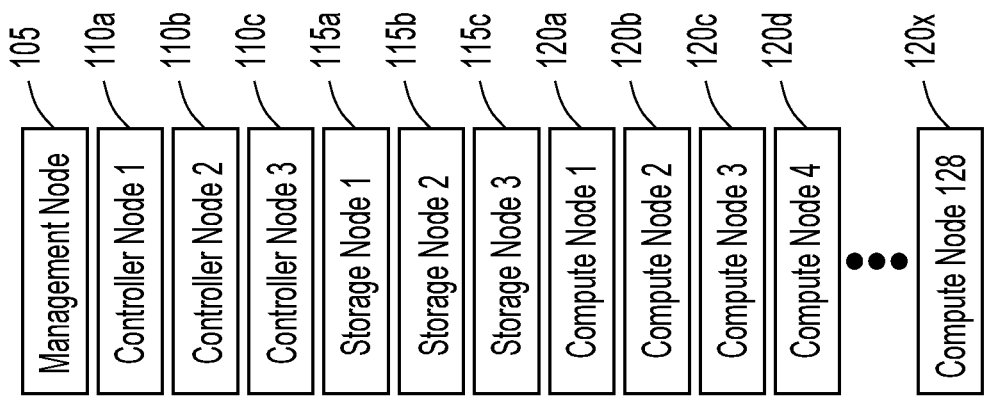
FIG. 1 illustrates an example network function virtualization infrastructure (NFVI) point of delivery (POD) configuration, according to an example embodiment.

Installers of cloud infrastructure devices, such as OpenStack® installers, are used to deploy cloud infrastructure services on baremetal servers using automation tools. Such installers typically utilize one or a group of servers as "installer database servers" and these nodes are typically referred to as "management nodes" in a point-of-delivery (POD), such as an OpenStack POD. Current cloud architectures, including OpenStack, do not support centralization of a management node due to cobbler, latency, and/or security concerns. Thus, as shown in FIG. 1, a typical POD 100, which is embodied as an OpenStack POD 100, is configured with various nodes including a management node 105, controller nodes 110a-c, storage nodes 115a-c, and compute nodes 120a-x (with some examples having as many as 128 compute nodes).

Figure 2:
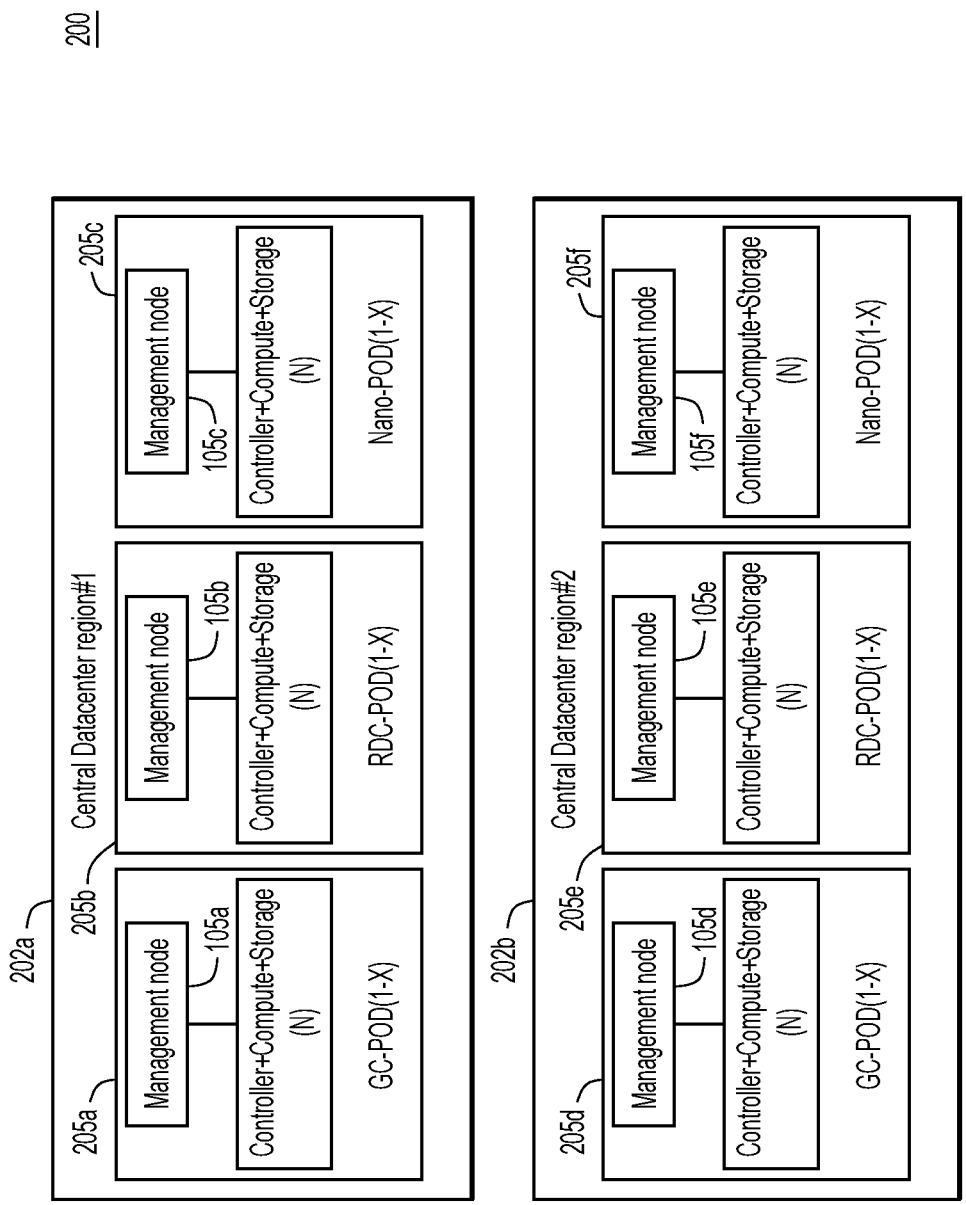
FIG. 2 is a block diagram of a plurality of cloud PODs arranged into first and second data centers, according to an example embodiment.

A primary purpose of a management node in a POD is to deploy a Virtual Infrastructure Management (VIM) cloud and then manage the POD. However, after deployment, use of the management node is often limited to collecting statistics and forwarding such information to centralized locations. FIG. 2 is a block diagram illustrating an example POD deployment for a typical mobile provider involving a central, regional and edge network function virtualization infrastructure (NFVI) cloud deployment scenario.

As illustrated in the system 200 of FIG. 2, central data centers 202a and 202b may contain numerous OpenStack PODs 205a-f, each of which includes one management node 105a-f. The number of PODs within a central data center may reach into the tens of thousands. For example, central data center 202a may include 2000 or more group center (GC) PODs 205a, 100 or more regional data center (RDC) PODs 205b, and/or 1000 or more Nano-PODs 205c. Similarly, central data center 202b may include 2000 or more GC PODs 205d, 100 or more RDC PODs 205e, and/or 1000 or more Nano-PODs 205f.

For some locations, such as multi-access or mobile edge compute (MEC) locations (e.g., GC locations), virtualized Radio Access Network (vRAN) workloads may be hosted in NFVI PODs that may have a smaller footprint (e.g., as compared to central and/or GC PODs) but may involve many locations (e.g., in the thousands or tens of thousands). In such a deployment, it may be inefficient to deploy a management node at each MEC/vRAN POD because of power and space constraints.

Thus, in a large-scale edge-cloud deployment, there may be 2000-4000 PODs (e.g., a group center arranged at the edge may contain 1-5 PODs per location). The number of management nodes 105a-f provided in such deployments may be calculated as follows:

Number of clouds * 1=Number of management nodes for a complete deployment

Therefore, deployments that contain thousands of PODs will also contain thousands of management nodes with one-to-one correspondence. Deployments involving per-POD management nodes may present a large cost to network operators, as the management nodes 105a-f may be considered installer jumpboxes, which may not be revenue generating. Further, the current management node per-POD architecture may increase complexity for deployments. Thus, operationally, an architecture involving a management node per-POD may be inefficient due to backup procedures and dedicated monitoring. Maintaining High Availability (HA) of an under cloud architecture may further increase overhead.

According to the techniques of the present disclosure, OpenStack data centers may be re-architectured such that a centralized management node may be implemented at a main or centralized data center. This centralized management node may include capabilities to manage thousands of VIM PODs (edge or otherwise) deployed geographically at different locations. An example embodiment of such an architecture is illustrated in FIG. 3.

Figure 3:
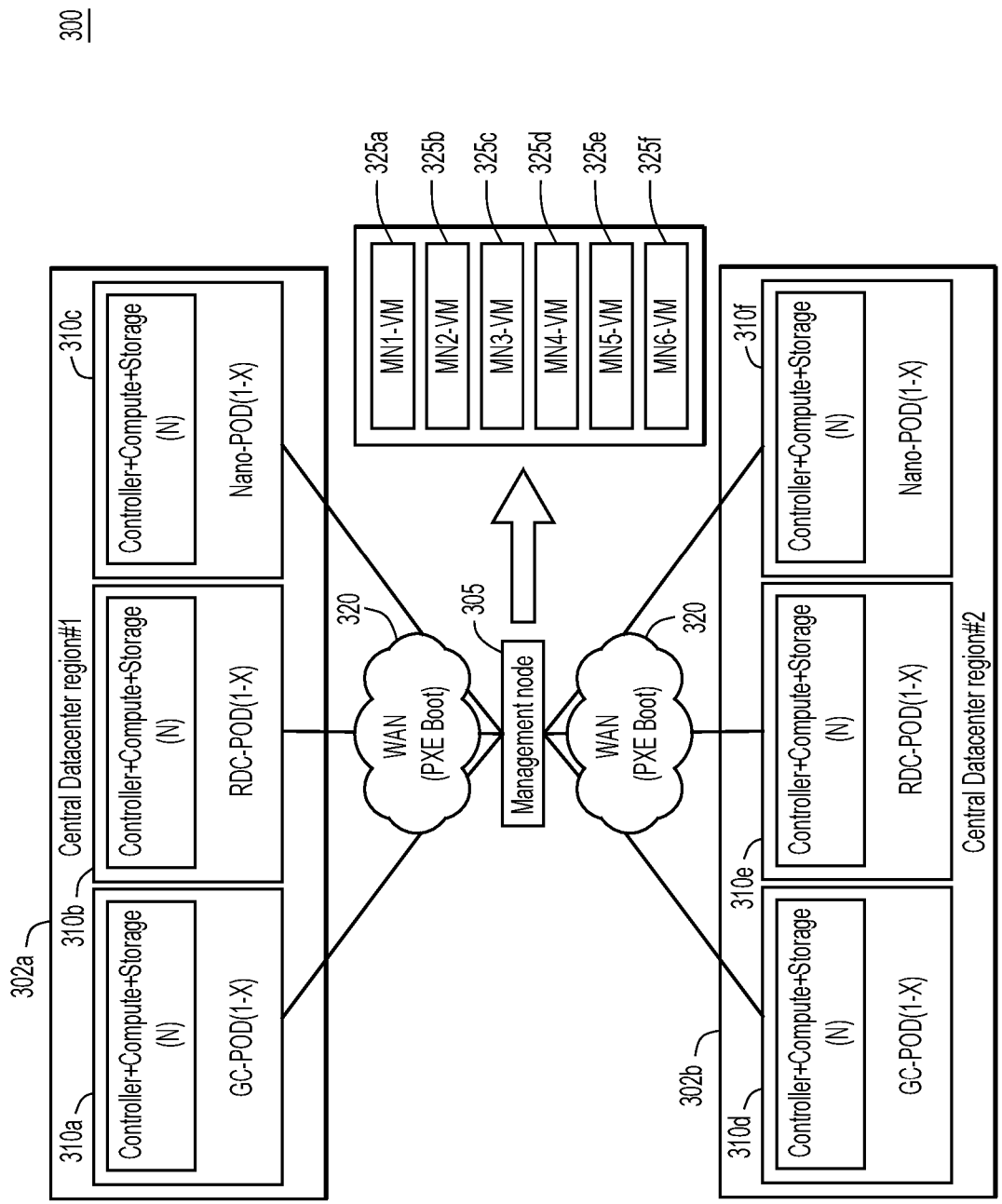
FIG. 3 is a block diagram of an arrangement of a centralized management node for a plurality of cloud PODs utilizing a Wide Area Network (WAN), according to an example embodiment.

Referring to FIG. 3, depicted therein is a block diagram of a system 300 in which a centralized management node 305 is implemented according to an example embodiment of the techniques of the present disclosure. The systems and methods of the present disclosure provide a centralized management node 305 that can connect to PODs 310a-f of data centers 302a and 302b. In some embodiments, the connection may be provided using a Layer 2 (L2) or Layer 3 (L3) Wide Area Network (WAN) 320; however, in some embodiments the connection may be provided via L3 Local Area Network (LAN) switching mechanisms, as illustrated in system 400 of FIG. 4. As depicted in system 400 of FIG. 4, centralized management node 305 provides analogous functionality to the centralized management node of FIG. 3, but connects to PODs 310a-f of central data centers 302a and 302b via LAN switching 410.

Returning to FIG. 3, during operation, the centralized management node 305 may be used for deploying OpenStack (e.g., facilitating distribution of images and other deployment procedures) or another form of cloud infrastructure, and after deployment, management node 305 may monitor the deployments using various tools. In various embodiments, the centralized management node 305 may be deployed either as a virtual machine (VM) or microservice based on availability of cloud resources. A non-exhaustive list of features provided by centralized management node 305 include:

1. Systems and methods to dimension the centralized management node 305 per cloud infrastructures. Following experimentation with management node image size, message queues, and network implementations, it may optimal, in some embodiments, to have approximately 10 management node instances per compute server and/or per 1 Terabyte (TB) hard disk.
2. Systems and methods for automatic compute node deployment using secured remote Preboot eXecution Environment (PXE) boot image distribution. During operation, such processes may begin with a Dynamic Host Configuration Protocol (DHCP) request from a compute server under deployment. In at least one embodiment, the request may be communicated over a WAN that may use DHCP relay(s) from intermediate devices such as Top-of-Rack (TOR) switches and/or routers. In at least one embodiment, the Image boot of the Operating System (OS) may be split across two images (e.g., "stage1.img" and "stage2.img") in which both images may be booted over the WAN.

3. Operating System (OS) image certificate validation may be provided to ensure security of a cloud deployment. Such image security certificate validation may be deployed using a certificate authority (i.e., "ROOT CA") certificate hierarchy.

In order to provide management features for each of PODs 310a-f, management node 305 may be configured to execute management virtual machines (VMs) 325a-f. According to this example embodiment, each of virtual machines 325a-f performs functions corresponding to management nodes 105a-f of FIG. 1 for a respective one of PODs 310a-f. In other words, if the techniques of the present disclosure are applied to POD 100 of FIG. 1, management node 105 would be executing as a VM on a centralized management node, such as centralized management node 305 of FIG. 3. Similarly, management nodes 105a-f of FIG. 2 would be executing as VMs on one or more centralized management nodes, such as centralized management node 305 of FIG. 3.

Figure 5:
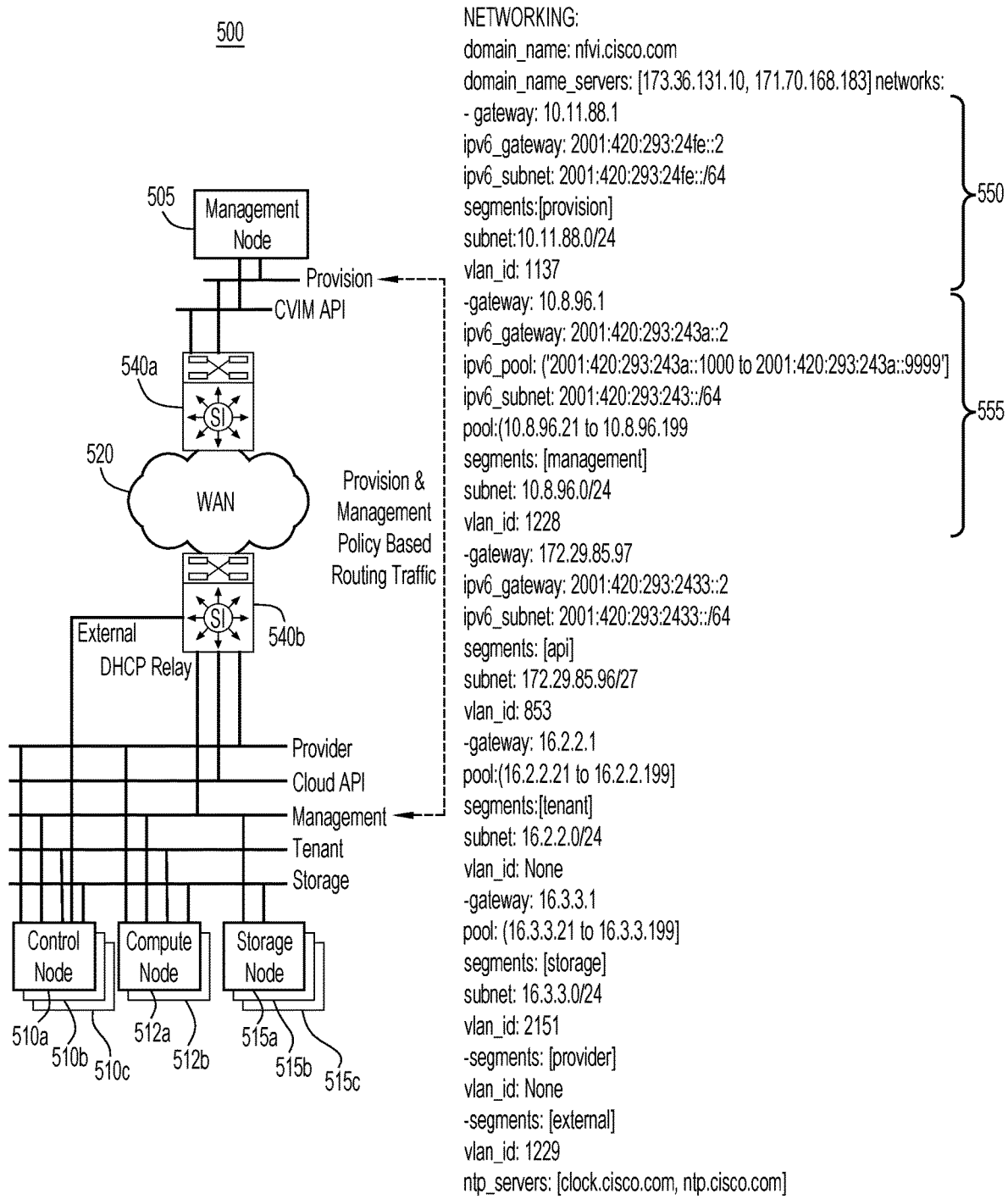
FIG. 5 is a block diagram illustrating a network split for providing centralized provisioning and management of cloud PODs, according to an example embodiment.

Referring to FIG. 5, depicted therein is a block diagram 500 illustrating other example details associated with a management and provisioning network split for implementing a centralized management node, according to an example embodiment. Illustrated in FIG. 5 are a centralized management node 505, a plurality of controller nodes 510a-c, a plurality of storage nodes 515a-c and a plurality of computes nodes 512a and 512b. Centralized management node 505 provides and obtains data to and from the plurality of controller nodes 510a-c, the plurality of storage nodes 515a-c and plurality of computes nodes 512a and 512b through WAN 520 via WAN edge routers 540a and 540b.

As shown through network parameters 550 and 555, centralized management node 505, which provides both management and provisioning functions, does so using a network split. By comparing provisioning network parameters 550 with management network parameters 555, it may be seen that the provisioning operations utilize different gateways, subnets and Virtual Local Area Networks (VLANs) than those used by management operations.

Figure 6A:
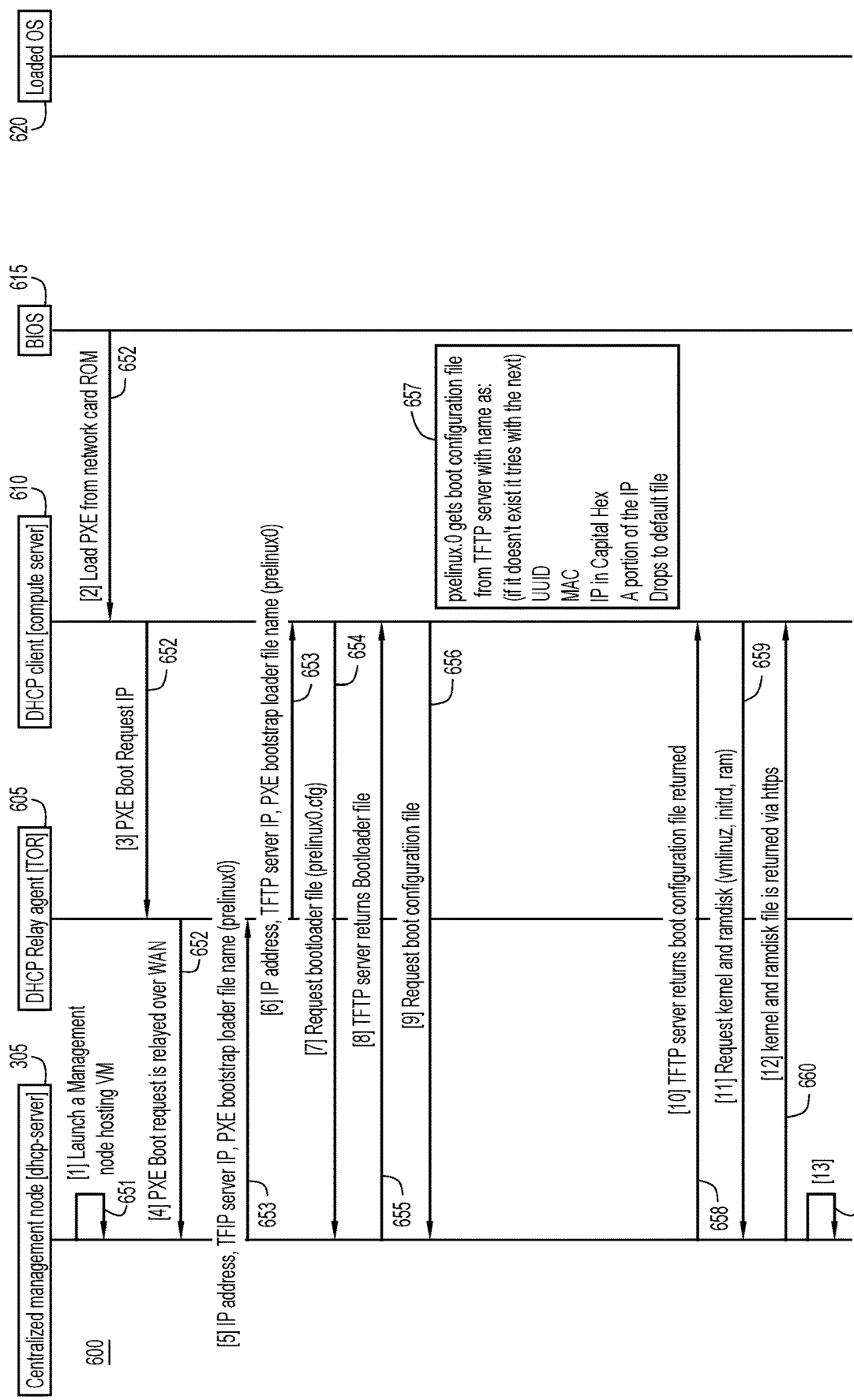
FIGS. 6A and 6B illustrate a first call flow diagram for an example call flow associated with implementing a centralized management node for cloud networks, according to an example embodiment.
Figure 6B:
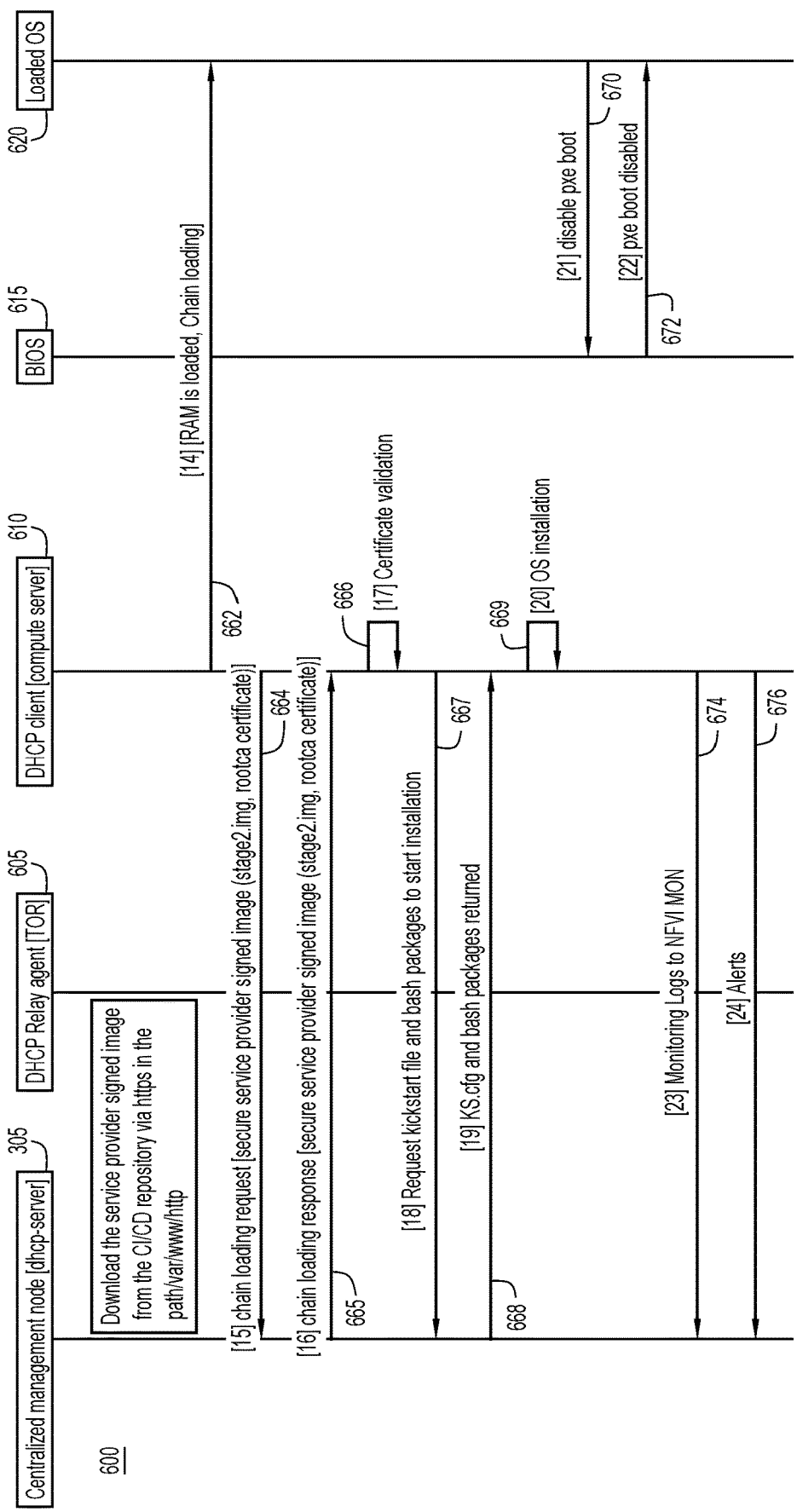

With reference now made to FIGS. 6A and 6B, depicted therein is a call flow diagram 600 illustrating a message exchange for installing an operating system (OS) on a node via a centralized management node 305. More specifically, call flow diagram 600 illustrates the installation of an OS on a DHCP client which is embodied as a compute server or POD arranged within a regional data center, such as a compute node arranged within POD 310a of regional data center 302a of FIG. 3. According to the example of FIGS. 6A and 6B, the OS image may be broken into two images, including first and second stage image files, "stage1.img" and "stage2.img", respectively. The content of the "stage1.img" file may be selected based on server hardware and firmware configurations. For example, the "stage1.img" image file may contain one or more of the following non-exhaustive list of files: a bootloader file, a boot configuration file, a flinuz file, and a random access memory (RAM) or ramdisk file. The "stage2.img" image file may include the actual OS file (e.g., Windows, Linux, etc.) to be installed on the server. In particular, call flow diagram 600 illustrates example details associated with a first design option including operations for PXE booting over the WAN using the "stage1.img" image file and performing secure chain loading of the "stage2.img" image file with certificate authentication.

Various features associated with call flow diagram 600 may include the following non-exhaustive list of messages and operations. Call flow diagram 600 begins in operation 651 in which the VM machine associated with a POD is launched at the centralized management node 305. In other words, the centralized management node 305 is installed as VM in a centralized location. When a new baremetal server comes online for a compute server 610 and is ready for a server install, the Basic Input/Output System (BIOS) 615 of the compute server 610 sends a Broadcast DHCP PXE boot request 652. In other words, the compute server 610 serves as a DHCP client for the messages and operations illustrated in call flow diagram 600.

Boot request 652 is forwarded through TOR switch 605, which is configured as a DHCP relay agent. More specifically, TOR switch 605 broadcasts DHCP PXE boot request 652 over the WAN network to the centralized management node 305 (also referred to herein interchangeably as the central management node VM), which may be provisioned with/act as a DHCP server.

Upon receipt of DHCP PXE boot request 652, a VM associated with central management node 305 may send DHCP boot response 653. DHCP boot response 653 is sent forward through TOR switch 605 to compute server 610, and includes the following parameters:

the Internet Protocol (IP) address for management node 305;
a Trivial File Transfer Protocol (TFTP) server address; and
a PXE boot loader file name (e.g., prelinux0).

Specifically, centralized management node 305 may serve as a TFTP server, a HyperText Transfer Protocol Secure (HTTPS) server, or another type of file server known to the skilled artisan that will allow compute server 610 to download files as part of the provisioning process illustrated through call flow diagram 600.

Upon receipt of DHCP boot response 653, compute server 610 recodes DHCP boot response 653 and will request the bootloader file (i.e., "prelinux0") by sending bootloader file request 654. Bootloader file request 654 initiates an exchange that includes centralized management node 305 sending the bootloader file to compute server 610 through the message of operation 655, and compute server 610 responding with boot configuration file request 656. In operation 657, compute server 610 uses the "prelimux0" file to determine a Universal Unique identifier (UUID), a Media Access Control (MAC) address, an IP address in Capital Hex, and/or other information known to the skilled artisan.

Upon completion of operation 657, compute server 610 receives the boot configuration file from centralized management node 305 in operation 658, and requests the kernel and ramdisk file in operation 659, which are received at compute server 610 in operation 660. In operation 662, the RAM and kernel are loaded into the OS 620. Upon completion of operation 662, compute server 610 has loaded the file associated with the first image file "image1.img."

In operation 663, centralized management node 305 downloads a service provider signed image which may be used to load the "stage2.img" image. More specifically, centralized management node 305 will load the signed image from the Continuous Integration/Continuous Delivery (CI/CD) directory.

In operation 664, compute server 610 starts the chain loading request (e.g., requesting the signed "stage2.img"

image file and "rootca" certificate), and receives the chainloading response in operation 665. The chainloading response of operation 665 includes the signed "stage2.img" image file and the "rootca" certificate of the image. Certificate validation is performed in operation 666 by the compute server 610 using the "rootca" certificate of the signed "stage2.img" image file.

If the certificate validation is successful, the compute server 610 requests a kickstart file (e.g., a file that helps in OS installation) in operation 667 and the centralized management node 305 sends the kickstart file and bash packages in operation 668. Compute server 610 installs the OS in operation 669 using the received files. Once the OS installation is successful, the BIOS 615 of the compute server 610 sends a deactivate PXE to the loaded OS 620 in operation 670. This step is utilized to limit any fraudulent server from PXE booting compute server 610 for a second time. In operation 672, the loaded OS 620 disables the PXE boot.

Finally, in operations 674 and 676, monitoring of the compute server 610 is performed by the centralized management node 305, which will be described in greater detail below. The operations described above with reference to FIGS. 6A and 6B may repeat for a second POD server device, arranged within the same or a different POD utilizing the same or a different virtual machine executing on centralized management node 305.

Figure 7:
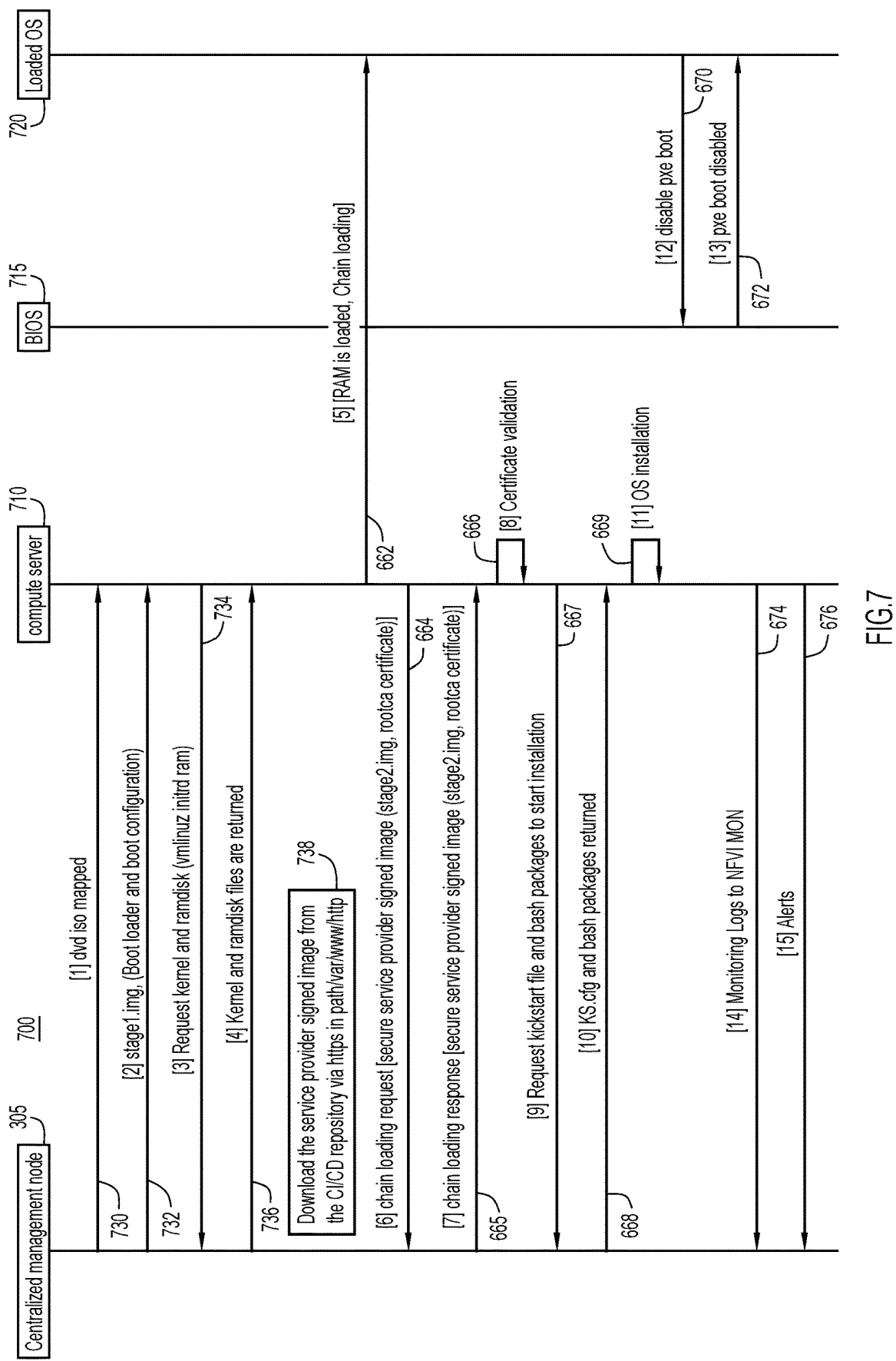
FIG. 7 illustrates a second call flow diagram for an example call flow associated with implementing a centralized management node for cloud networks, according to an example embodiment.

With reference now made to FIG. 7, depicted therein is a second design option for bootloading the first and second image files, "image1.img" and "image2.img." More specifically, FIG. 7 includes call flow diagram 700 that illustrates a call flow associated with implementing a centralized management node for telecommunication cloud networks, according to an example embodiment. In particular, call flow diagram 700 illustrates example details associated with a second design option in which the images may be broken into a "stage1.img" image file that includes a bootloader file and boot configuration file bundled in a Digital Video Disc (DVD) International Organization for Standardization (ISO) file. The "stage2.img" image file includes the OS file to be installed. The kernel and ramdisk are requested over the WAN from the centralized management node 305.

Prior to operation 730, the "stage1.img" image file may be a small DVD ISO that may be mapped via a virtual DVD on the centralized management node 305. In operation 730, the "stage1.img" image file DVD ISO is mapped to the compute server 710. The IP address to the compute server is installed via the "stage1.img" image file DVD ISO itself. The server is rebooted and the "stage1.img" image file is installed via operation 732.

Compute server 710 requests the kernel and the ramdisk file from the centralized management node 305 in request 734, and the kernel and the ramdisk file are returned to compute server 710 from centralized management node 305 in operation 736.

Centralized management node 305 provides the kernel and the ramdisk files to the compute server 710 in operation 736, and compute server 710 downloads the service provider signed image from the CI/CD repository in the HTTPS server path "/var/www/http."

Remaining steps may be performed using similar operations as discussed above for FIGS. 6A and 6B, and therefore, like reference numerals have been used to refer to like operations. In operation 662, the RAM and kernel are loaded into the host OS 720. Upon completion of operation 662, compute server 610 has loaded the file associated with the first image file, "image1.img."

In operation 738, centralized management node 305 downloads a service provider signed image which may be used to load the "stage2.img" image file. More specifically, centralized management node 305 will load the signed image from the CI/CD directory.

In operation 664, compute server 710 starts the chain loading request (e.g., requesting the signed "stage2.img" image file and "rootca" certificate), and receives the chainloading response in operation 665. The chainloading response of operation 665 includes the signed "stage2.img" image file and the "rootca" certificate of the image. Certificate validation is performed in operation 666 by the compute server 710 using the "rootca" certificate of the signed "stage2.img" image file.

If the certificate validation is successful, the compute server 710 requests a kickstart file (e.g., a file that helps in OS installation) in operation 667, and the centralized management node 305 sends the kickstart file and bash packages in operation 668. Compute server 710 installs the OS in operation 669 using the received files. Once the OS installation is successful, the BIOS 715 of the compute server 710 sends a deactivate PXE to the loaded OS 720 in operation 670. This step is utilized to limit any fraudulent server from PXE booting compute server 710 for a second time. In operation 672, the loaded OS 720 disables the PXE boot.

Finally, in operations 674 and 676, monitoring of the compute server 710 is performed by the centralized management node 305, which will be described in greater detail below. The operations described above with reference to FIG. 7 may repeat for a second POD server device, arranged within the same or a different POD utilizing the same or a different virtual machine executing on centralized management node 305.

Accordingly, techniques described herein may provide for the ability to provide chain boot security during PXE boot. For example, a compute server or POD acting as a DHCP client may start a chainloading request (e.g., requesting the signed "stage2.img" image file and "rootca" certificate). A centralized management node acting as a DHCP server may send a chain loading response (e.g., the signed "stage2.img" image file and the "rootca" certificate) and the compute server or POD acting as a DHCP client may perform certificate validation using the "rootca" certificate of the signed "stage2.img" image file.

Figure 8:
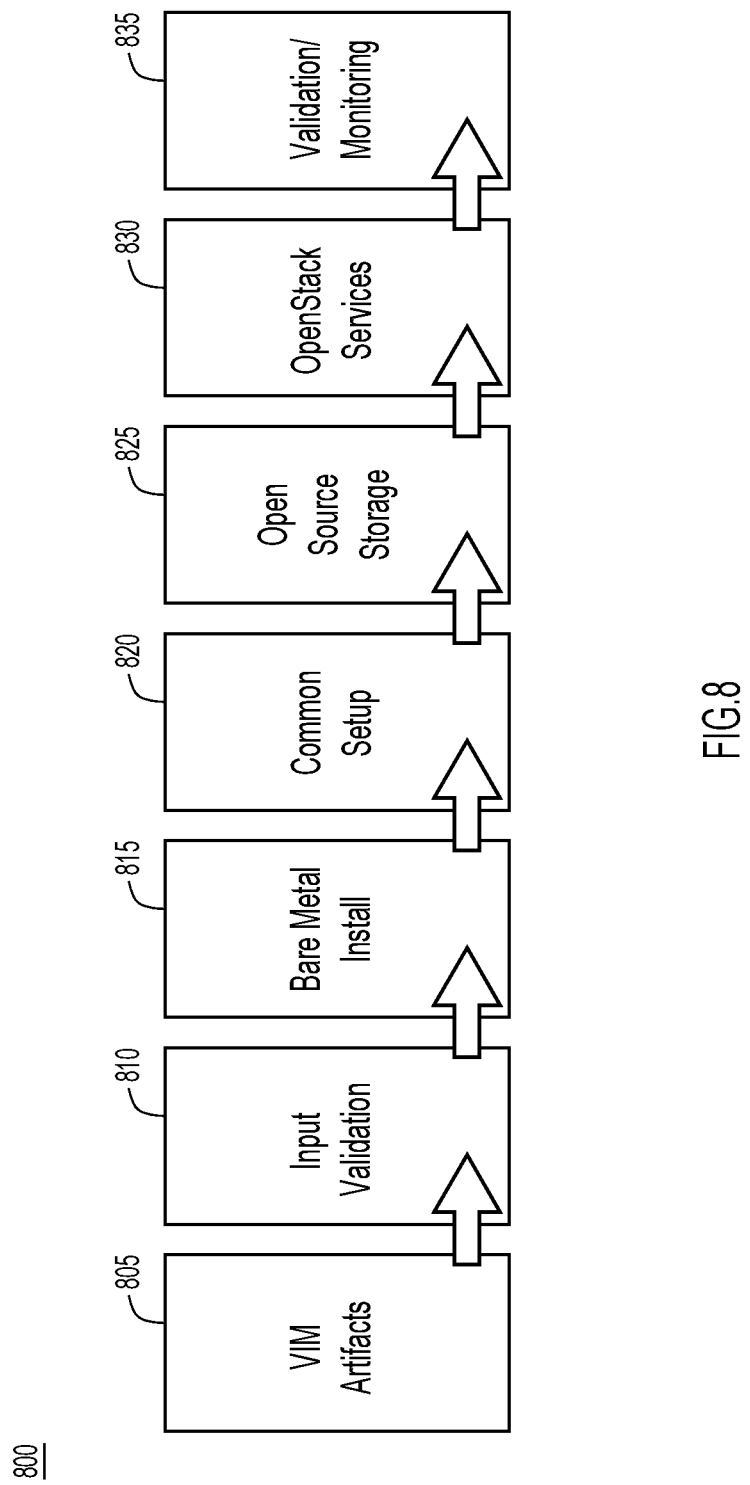
FIG. 8 is a block diagram illustrating example details associated with artifact deployment by a centralized management node, according to an example embodiment.

FIG. 8 is a block diagram 800 illustrating example details associated with artifact deployment by a centralized management node, according to an example embodiment. Embodiments herein may provide methods to perform selective artifact onboarding once an image is deployed in compute servers/PODs.

For example, a centralized management node via, for example, a VM may selectively identify a number of compute servers on which OpenStack artifacts may be deployed using steps as illustrated in FIG. 8, which may provide for an optimization of space via selective onboarding of POD artifacts. In a traditional management node, all the artifacts from the compute resources are downloaded by the management node. However, as techniques herein provide for centralized management node VM architectures, cobbler optimizations may be provided in order to download only specific artifacts from a compute node.

During operation, for example, a centralized orchestration platform may start the deployment of OpenStack on a VIM. The execution of steps may take place via a management node to selectively deploy the artifacts (e.g., install images, repositories, and other artifacts known to the skilled artisan). The artifacts may be downloaded either from online repositories or through offline repositories. In at least one embodiment, the management node VM may perform selective artifact downloads based on features defined in input intent files. This optimization may be utilized to keep the size of the management node VM down.

As shown in FIG. 8, VIM artifacts 805 are downloaded. The VM associated with the management node will then, in turn, provide input validation 810, provide a bare metal install 815, provide a common setup 820, provide open source storage 825 (e.g., CEPH storage), provision OpenStack services 830, and ultimately provide validation and monitoring 835.

Figure 9:
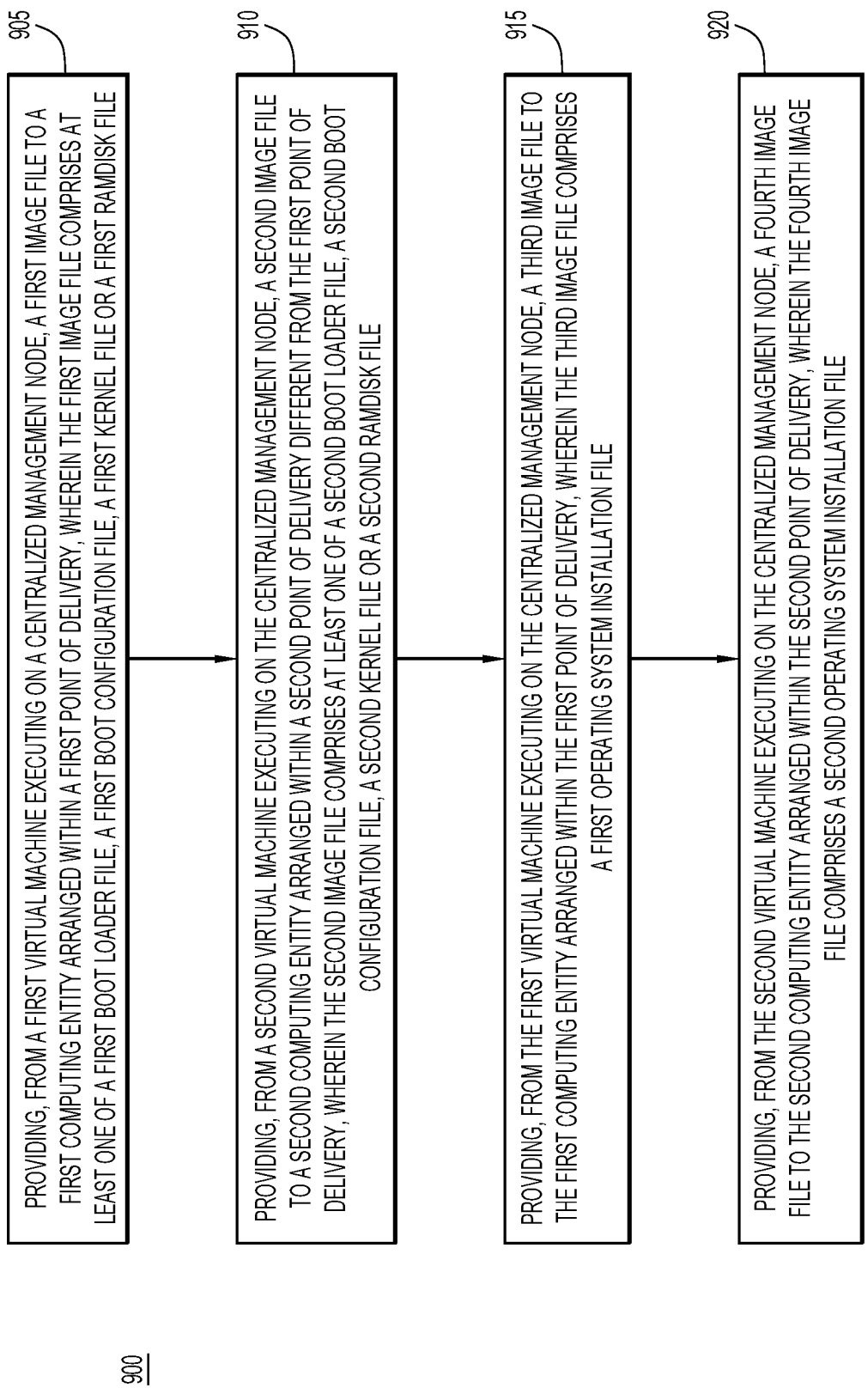
FIG. 9 is a flowchart illustrating a process flow for implementing centralized management of cloud networks, according to an example embodiment.

With reference now made to FIG. 9, depicted therein is a flowchart 900 illustrating a process flow according to the techniques of the present disclosure. The process flow of flowchart 900 begins in operation 905 where a first virtual machine executing on a centralized management node provides a first image file to a first computing entity arranged within a first point of delivery, wherein the first image file comprises at least one of a first boot loader file, a first boot configuration file, a first kernel file or a first ramdisk file. Accordingly, operation 905 may be embodied as one or more of operations 655, 658 and/or 660 of FIGS. 6A and 6B for a device arranged within a first POD. Operation 905 may also be embodied as one or more of operations 732 and/or 736 of FIG. 7 for a device arranged within a first POD.

In operation 910, a second virtual machine executing on the centralized management node provides a second image file to a second computing entity arranged within a second point of delivery, wherein the second image file comprises at least one of a second boot loader file, a second boot configuration file, a second kernel file or a second ramdisk file. Accordingly, operation 910 may be embodied as one or more of operations 655, 658 and/or 660 of FIGS. 6A and 6B for a device arranged within a second POD. Operation 910 may also be embodied as one or more of operations 732 and/or 736 of FIG. 7 for a device arranged within the second POD.

In operation 915, the first virtual machine executing on the centralized management node provides a third image file to the first computing entity arranged within the first point of delivery. The third image file comprises a first operating system installation file. Accordingly, operation 915 may be embodied as operations 665 and/or 668 of FIGS. 6A and 6B for the device arranged within the first POD. Operation 915 may also be embodied as one or more of operations 665 and/or 668 of FIG. 7 for the device arranged within the first POD.

Finally, in operation 920, the second virtual machine executing on the centralized management node provides a fourth image file to the second computing entity arranged within the second point of delivery. The fourth image file comprises a second operating system installation file. Accordingly, operation 920 may be embodied as operations 665 and/or 668 of FIGS. 6A and 6B for the device arranged within the second POD. Operation 915 may also be embodied as one or more of operations 665 and/or 668 of FIG. 7 for the device arranged within the second POD.

In summary, the centralization of a management node may optimize resources, improve cloud security and/or operational efficiency, and/or also provide for the ability to scale telecommunication cloud (TelcoCloud) deployments. For larger deployments, the savings may be significant for enterprise/service providers. Techniques presented herein may therefore facilitate rapid cloud deployments for enterprise/service providers.

In at least one embodiment, chain boot for compute security may be provided via booting the PXE image in two stages. A first stage may involve booting the kernel image. A second image, which may be the actual installation image, may be signed by the "rootca" certificate of the service provider and the DHCP client (e.g., a compute server) may implement certificate validation of the boot image.

In at least one embodiment, the centralized management node install may involve optimization of artifacts downloading on the WAN from the compute resources. Optimization techniques may be implemented on a DHCP client to reduce the number of artifacts downloaded.

In at least one embodiment, as Application Programming Interface (API) requests from the centralized management node to the compute resources are over a WAN, there may be a secure token exchange between the centralized management node and the compute resources for downloading artifacts and resources.

Once PODs are established and provisioned, administrators may seek to monitor the performance of the PODs and the individual nodes within the PODs. Specifically, for an enterprise or service provider, the edge of a network may be relative, as it may depend upon physical constraints such as, for example, subscriber population density, WAN transport availability, rack space, power, air-conditioning, and other considerations known to the skilled artisan. With innovations in mobile edge computing (MEC), an enterprise/service provider edge may be needed that can serve smaller remote areas as well as small and midsize towns. To ensure proper performance and to optimize performance of various clouds (e.g., VIM instances), monitoring may be performed by various monitoring components at a central location.

Figure 10:
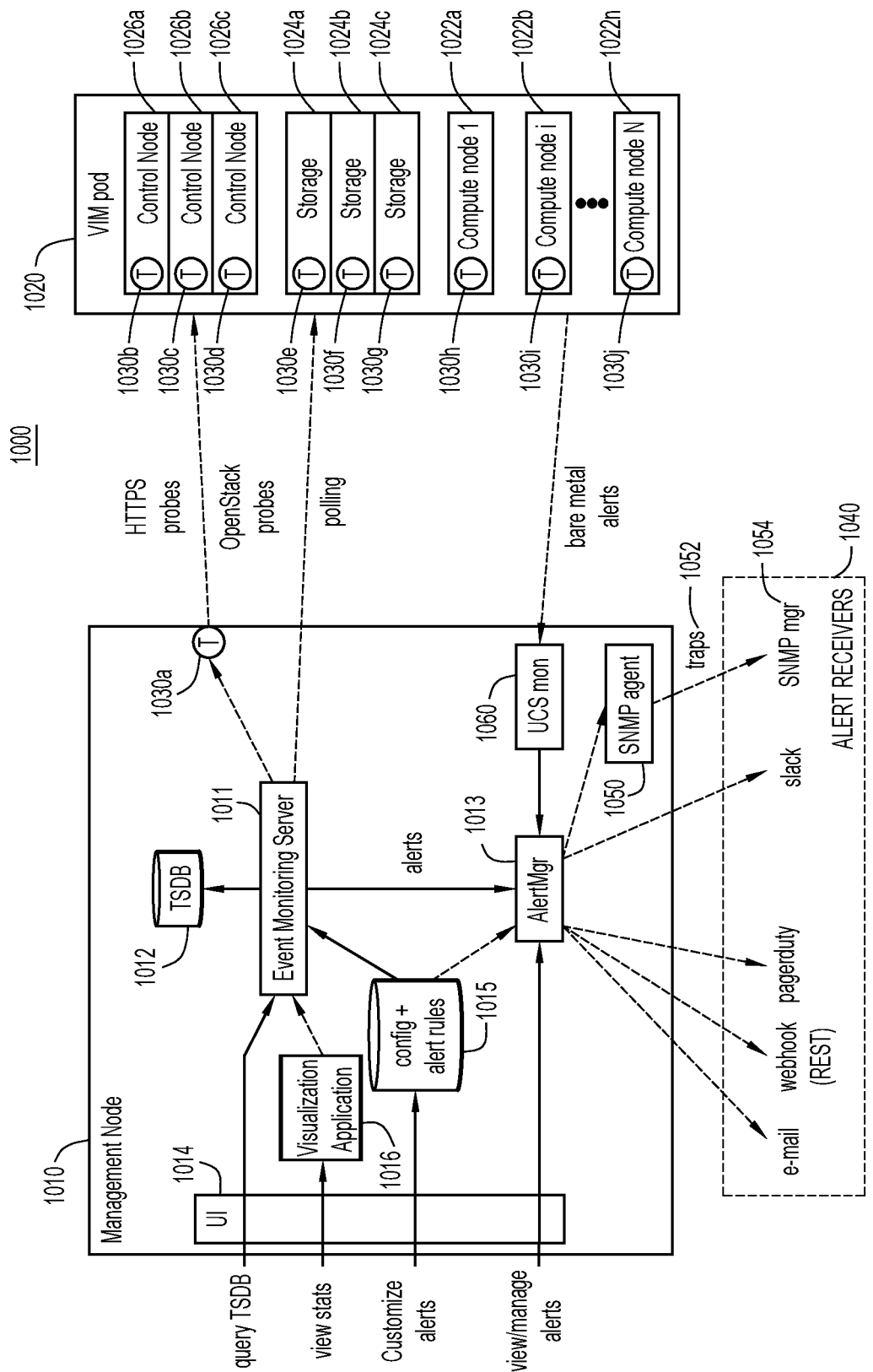
FIG. 10 is a block diagram illustrating a system that includes virtual infrastructure manager (VIM)-monitoring (MON) functionality within a management node and a VIM POD configuration, according to an example embodiment.

FIG. 10 is a block diagram illustrating a system that includes a virtual infrastructure manager (VIM)-monitoring (MON) architecture 1000 with a management node 1010 and a VIM POD 1020 configuration. That is, to deploy a telecommunication cloud mobile core network, mobile network operators may use open source software, such as OpenStack. A VIM POD 1020 may employ OpenStack for distributed TelcoCloud deployments and enterprise clouds. As such, included in VIM POD 1020 are compute nodes 1022a-n, storage nodes 1024a-c, and controller nodes 1026a-c. The actual number of nodes depends on a particular deployment. The VIM POD 1020 may use a monitoring mechanism at the cloud/NFVI POD level. The monitoring mechanism may employ an event monitoring server 1011 that may be embodied as a Prometheus server, and that is hosted on management node 1010.

Specifically, VIM monitoring is performed using a lightweight POD-level monitoring solution called VIM-MON that is based on an open source Prometheus, Telegraf, Grafana (PTG) stack. The VIM-MON architecture 1000 employs infrastructure-level metric collection based on metric collection and reporting agents installed on all nodes in the VIM POD 1020. The metric collecting and reporting agents 1030a-j, are represented with a "T" in a circle as they may be embodied as Telegraf agents. Further, VIM-MON architecture 1000 employs metric aggregation into a time-series database (TSDB) 1012 installed on the management node 1010. VIM-MON architecture 1000 also provides alert manager 1013 integrated in the management node 1010 and a monitoring graphical interface 1014 with pre-defined dashboards customized for VIM. Statistics may be visualized using a visualization application 1016, such as Grafana. Bare metal alerts may be provided for through Unified Computing System Monitor 1060.

VIM-MON architecture 1000 may be implemented through a number of containers and processes deployed by a VIM installer when an option for VIM-MON architecture 1000 is enabled. As noted above, metrics may be collected by metric collecting and reporting agents 1030*a-j*. There is one metric collecting and reporting agent 1030*a-j* per node in VIM POD 1020. Most metrics are local; some metrics are collected using remote APIs (e.g. the metric collecting and reporting agent 1030*a* on the management node 1010 collects OpenStack metrics using the OpenStack API). These metrics are then read ("scraped") by the event monitoring server 1011 running on the management node 1010 at regular intervals (e.g., a default scraping interval of 15 seconds). Metrics that are scraped are received on the management node 1010 and are then stored in the local TSDB 1012.

These incoming metrics are also used by the event monitoring server 1011 to evaluate alerting rules (which are rules based on the value of metrics using programmable expressions and that are stored in configuration and alert rules database 1015). When an alerting rule becomes active, an alert is created in the pending state. When a pending alert remains pending for a certain duration, it will become firing. Firing alerts are then sent to the alert manager 1013 in the management node 1010 for further processing. The alert manager may provide various firing alerts to one or more of the alert receivers 1040. Simple Network Management Protocol (SNMP) alerts may be sent via SNMP agent 1050, and they may utilize an SNMP trap 1052 and SNMP manager 1054.

VIM POD architectures may support up to 256 compute nodes 1022*a-n*, however, there may be limitations that impact performance and monitoring systems. For example, if there is any failure/overload, the management node 1010 may stop all metric collection from compute nodes 1022*a-n* in the VIM POD 1020. Also, the management node 1010 collects statistical key performance indicators (KPI) from all compute nodes 1022*a-n* and stores the collected data in TSDB 1012. Processing of the collected data is performed using event monitoring server 1011. The event monitoring server 1011 needs to run per each site to collect and process data. Having an event monitoring server 1011 per site is operationally complex to manage. Also, VIM is not deployed universally, meaning that not all PODs 1020 are of the same size and their deployments depend on customer configurations. For medium and smaller locations, there are limited hardware resources and a dedicated management node 1010 running a dedicated event monitoring server 1011 per site may be prohibitively costly.

Furthermore, when the management node 1010 is not available (e.g., due to congestion, overload, hardware failures, and software failures, among others), VIM-MON architecture 1000 may stop monitoring performance data. This results in POD-level TSDB isolation. Also, in VIM-MON architecture 1000, the management node 1010 may not be scalable to monitor large deployments (e.g., deployments that include hundreds of compute nodes 1022*a-n* deployed at multi-locations). Further, TSDB 1012 may be limited to a metric retention time (e.g., fifteen days), which results in automatic deletion of older metrics. Also, an edge POD may need a dedicated compute node 1022*a-n* for the monitoring of the management node 1010. Such a requirement may also lead to operational complexities.

Accordingly, in example embodiments of the present disclosure, a scalable VIM monitoring architecture may be deployed which is not tied to specific hardware for management. That is, a centralized VIM is deployed at central locations in highly available (HA) configurations that can handle various different failure scenarios of a cloud. The centralized VIM HA or the monitoring node monitors multiple clouds (VIM instances). The centralized VIM HA monitors distributed cloud deployments that may include multiple compute nodes, multiple storage nodes, and multiple controller nodes at each location. The centralized VIM HA in addition to monitoring various edge sites, also monitors a central data center and various other POD sites that may be of different sizes, including nano-pod sites. The actual number of nodes depends on a particular deployment. Accordingly, in various example embodiments, a centralized monitoring solution (centralized VIM-MON-HA) is provided that allows for monitoring large scale telco-workloads without compromising on speed and without suffering from various drawbacks of open source metric collection tools, such as the ones noted above.

Figure 11:
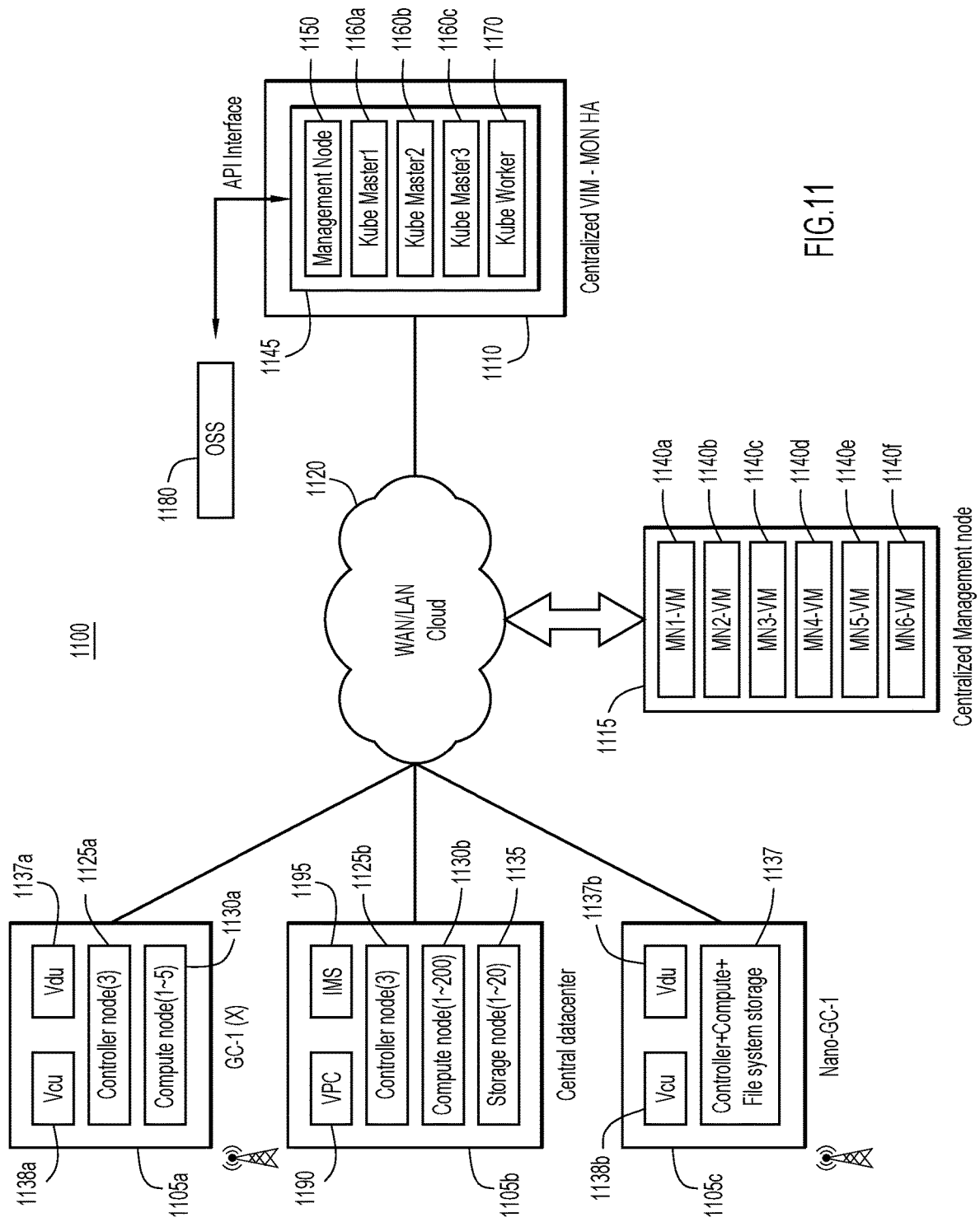
FIG. 11 is a block diagram illustrating a system that includes VIM-MON in a highly available (HA) configuration, according to an example embodiment.

FIG. 11 is a block diagram illustrating a system 1100 that includes VIM-MON-HA 1110, according to an example embodiment. In FIG. 11, the system 1100 includes a plurality of remote compute entities. The plurality of remote compute entities may include an edge data center or group center (GC-1) 1105*a*, a central data center 1105*b*, and a nano data center or group center (nano GC-1) 1105*c*. The system 1100 further includes a management node 1150 and a centralized VIM-MON-HA 1110. Also included in VIM-MON-HA 1110 is a centralized management node 1115, which may be analogous to centralized management node 305 of FIGS. 3 and 4, above. The compute entities of PODs 1105*a-c*, the centralized management node 1115, and the centralized VIM-MON-HA 1110 communicate with each other over wide area network/metropolitan area network (WAN/MAN) 1120, according to an example embodiment.

For some locations such as multi-access or mobile edge compute (MEC) locations (e.g., Group Center (GC) locations), virtualized Radio Access Network (vRAN) workloads may be hosted in NFVI PODs that may have a smaller footprint (e.g., as compared to central/regional data center PODs) but may involve many locations (e.g., in the thousands or tens of thousands).

Edge data center 1105*a* may include an edge POD. Edge data center 1105*a* may be a small VIM configuration or instance. Edge data center 1105*a* may consist of 3 controller nodes 1125*a* and 1-5 compute nodes 1130*a*, and may interface with storage nodes 1135 that are remote, such as within central data center 1105*b* (which also contains controller nodes 1125*b*, compute nodes 1130*b* and storage nodes 1135). Edge data center 1105*a* may be implemented to provide virtualized Distributed Unit (vDU) services 1137*a* and virtualized Central (or Centralized) Unit (vCU) services 1138*a* for a vRAN deployment in far edge remote locations for a mobile network. Similarly, nano data center 1105*c* may include a nano POD 1137. Central data center 1105*b* may be configured to provide virtual PortChannel (VPC) services 1190 and Internet Protocol Multimedia Subsystem (IMS) services 1195. The nano data center 1105*c* may be a far edge data center that provides vDU 1137*b* and vCU 1138*b* services for vRANs at remote locations. The nano data center 1105*c* may also provide file system storage. However, nano data centers, such as nano data center 1105*c*, typically consist of one controller and one compute node.

Figure 4:
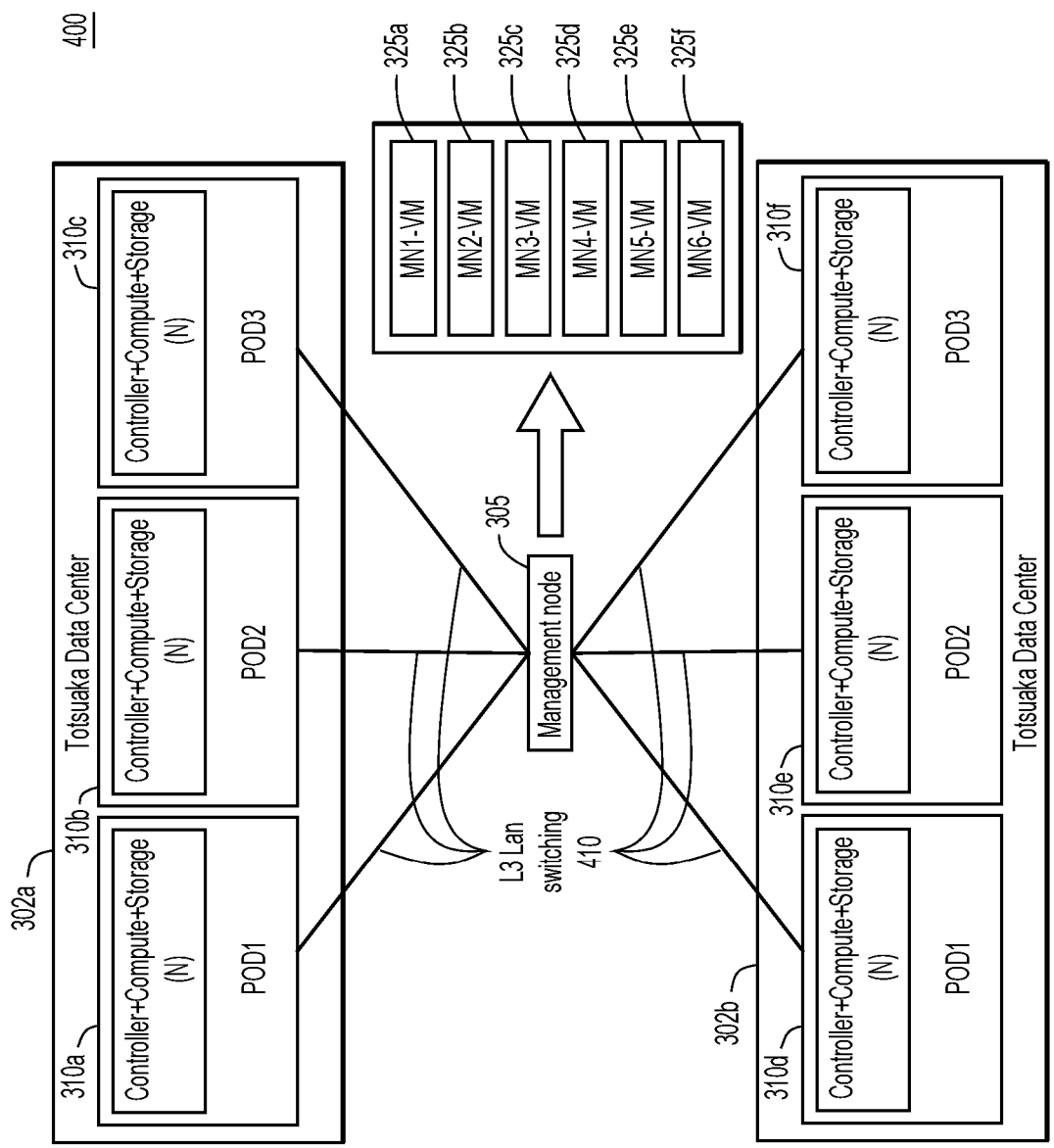
FIG. 4 is a block diagram of an arrangement of a centralized management node for a plurality of cloud PODs utilizing a Local Area Network (LAN), according to an example embodiment.

Centralized management node 1115 includes VMs 1140*a-f* which are described above in conjunction with reference numerals 325*a-f* in FIGS. 3 and 4. As explained above, it may be inefficient to deploy a management node at each data center because of power and space constraints.

Accordingly, a centralized management node 1115 may be provided that runs various VMs 1140a-f to manage PODs 1105a-c.

The VIM-MON-HA 1110 may be deployed at central locations in HA configurations and is configured to monitor multiple clouds (VIM instances). The VIM-MON-HA 1110 may be deployed at an edge location, as detailed below. The VIM-MON-HA 1110 may be deployed as a micro-service in kubernetes clusters (k8s) 1145 at a central site to manage several thousands of nodes, support longer retention time, and also decrease the monitoring footprint and resources on every monitored POD.

FIG. 11 illustrates VIM-MON-HA 1110 as executing separately from centralized management node 1115. According to other example embodiments, VIM-MON-HA 1110 may be incorporated into centralized management node 1115. Therefore, where the current description describes VIM-MON-HA 1110 (as well as other VIM-MON-HAs in other figures), the skilled artisan may understand that the VIM-MON-HA may be executing within a centralized management node, such as centralized management node 1115.

The VIM-MON-HA 1110 includes a management node 1150, three kubernetes (kube) masters 1160a-c which perform the functions of a controller, and one or more kube workers 1170 that are compute resources deployed in containers. According to one variation of an example embodiment, a customer's operation support system (OSS) 1180 is provided, as shown in FIG. 11. The OSS 1180 provides the functions of pulling metrics and alerts from the centralized VIM-MON-HA 1110. Instead of pulling alerts from each management node, in an example embodiment, the customer's OSS pulls the metrics from a single event monitoring server which is part of the centralized VIM-MON-HA 1110. The presence of OSS 1180 is optional and depends on the deployment of the customer's network.

Figure 12:
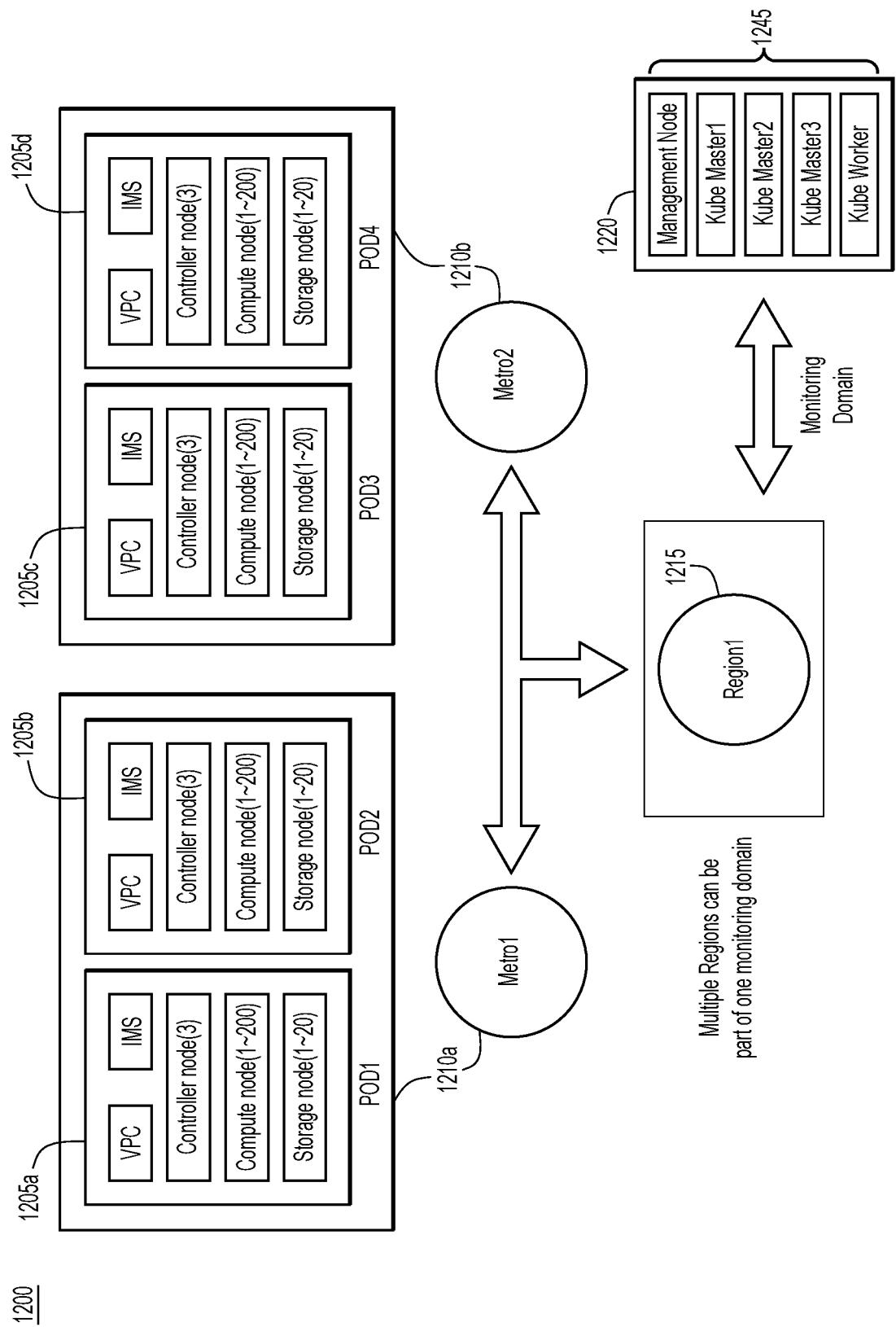
FIG. 12 is a block diagram illustrating a grouping of PODs for monitoring by VIM-MON-HA, according to an example embodiment.

FIG. 12 is a block diagram illustrating grouping 1200 of PODs for monitoring by VIM-MON 1220, according to an example embodiment. As shown in FIG. 12, monitored VIM PODs may be grouped into one or more metros 1210a and 1210b, and metros 1210a and 1210b may be grouped into one or more regions 1215. The set of regions that are monitored from the same centralized VIM-MON 1220 instance form a monitoring domain. The centralized VIM-MON 1220 that manages one monitoring domain is called a VIM-MON stack. A VIM-MON stack is made up of a set of containerized applications that run on a kubernetes cluster 1245, and as described with reference to kubernetes cluster 1145 of FIG. 11 above. One challenge of a centralized solution is to transport the metrics from a potentially very large number of servers to a central event monitoring server. In an example embodiment, metrics are transported from various locations to the central event monitoring server at good speed while avoiding the drawbacks of the open source metric collection tools described above.

Figure 13:
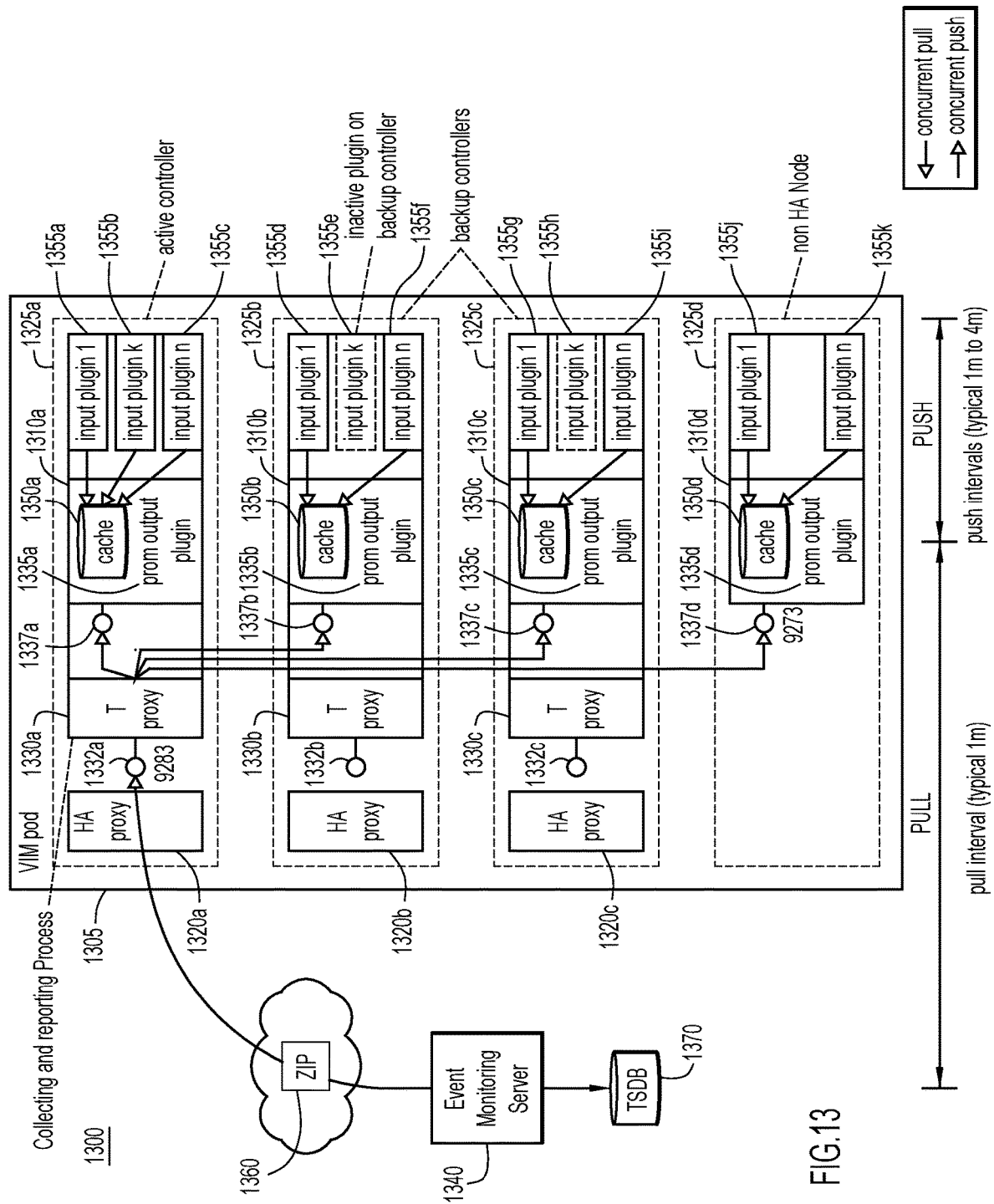
FIG. 13 is a block diagram illustrating metric collecting and reporting proxy placement and scraping functionality within a VIM POD configuration, according to an example embodiment.

FIG. 13 is a block diagram illustrating a VIM POD configuration 1300, according to an example embodiment. For example, VIM POD 1305 may be a more detailed view of one or more of PODs 1105a-c of FIG. 11 or PODs 1205a-d of FIG. 12. Accordingly, VIM POD 1305 includes four nodes, controller nodes 1325a-c and a non-controller node 1325d. Non-controller node 1325d may be one or more of a compute node or a storage node, such as compute nodes 1130a and 1130b or storage node 1135, as illustrated in FIG. 11.

Each of controller nodes 1325a-c includes an HA proxy 1320a-c, and a metric collecting and reporting agent 1310a-c. Included in each of metric collecting and reporting agents 1310a-c are a metric collecting and reporting proxy (T-proxy) 1330a-c and an accompanying T-proxy port 1332a-c, an event monitoring output plugin 1335a-c with accompanying ports 1337a-c, and caches 1350a-c. Each metric collecting and reporting agent 1310a-c also includes one or more input plugins 1355a-i. Non-controller node 1325d includes an event monitoring output plugin 1335d with an accompanying port 1337d and cache 1350d. Metric collecting and reporting agent 1310d includes one or more input plugins 1355j and 1335k, but lacks a T-proxy and its accompanying port. Non-controller node 1325d also lacks an HA proxy.

The centralized VIM-MON architecture relies on a 2-level hierarchical collection system based on the lightweight T-proxies 1330a-c running on each node 1325a-c. This design is a hybrid approach between the traditional Prometheus federation design, which uses two levels of Prometheus servers, and the simple single-level central Prometheus design.

As indicated above, metric collecting and reporting agents 1310a-c on the controller nodes 1325a-c include T-proxies 1330a-c. T-proxies 1330a-c are special plugins that provide an additional Representational State Transfer (REST) port or T-proxy port 1332a-c, which is a service port designated port 9283. The T-proxies 1330a-c service scraping requests from the event monitoring server 1340 behind the HA proxies 1320a-c. The HA proxies 1320a-c elect one controller node 1325a-c to process all REST requests, which in the example FIG. 3 is controller node 1325a, while the remaining two controller nodes 1325b and 1325c are running in a standby mode. That is, HA proxy 1320a provides a high-availability load balancer, and a proxy server for TCP and HTTP-based applications that spreads requests across multiple servers. There is an HA proxy 1320a-c running on each of controller node 1325a-c, but only HA proxy 1320a is active and the remaining ones, HA proxies 1320b and 1320c, are in a standby state. The T-proxy 1330a running on the active controller node 1325a receives the REST request from the central event monitoring server 1340. In an example embodiment, the HA proxy 1320a selects the active controller node 1325a which receives the REST request. The selection of the active controller node 1325a by the HA proxy 1320a is an internal messaging procedure.

As noted above, the metric collecting and reporting agent 1310a running on the active controller node 1325a services event monitoring scrape requests through its T-proxy 1330a service point. T-proxy 1330a collects all metrics from the event monitoring output plugins 1335a-d running in every metric collecting and reporting agent 1310a-d in the POD (including the local metric collecting and reporting agent 1310a) at port 9273. This collection is triggered on demand when receiving a request from a central event monitoring server 1340. Therefore, the central event monitoring server 1340 controls the frequency of scrape requests. Upon receiving a REST request, T-proxy 1330a schedules the individual node scraping (to port 9273) concurrently. The node scrapings pull values from caches 1350a-d, which have been populated with data from input plugins 1355a-k. The time to service a request may be bound by the longest time to collect metrics from any node event monitoring output plugin cache 1350a-d of the event monitoring output plugin 1335a-d. Since these metrics are read from in-memory cache (i.e., plugin cache 1350a-d), the time to service an event monitoring request is fast and may scale well as the POD size increases.

As illustrated in FIG. 13, T-proxy 1330a may return a response to the REST request as a compressed data file, such as ZIP file 1360. The contents of the ZIP file 1360 may be stored for analysis in TSDB 1370.

Figure 14:
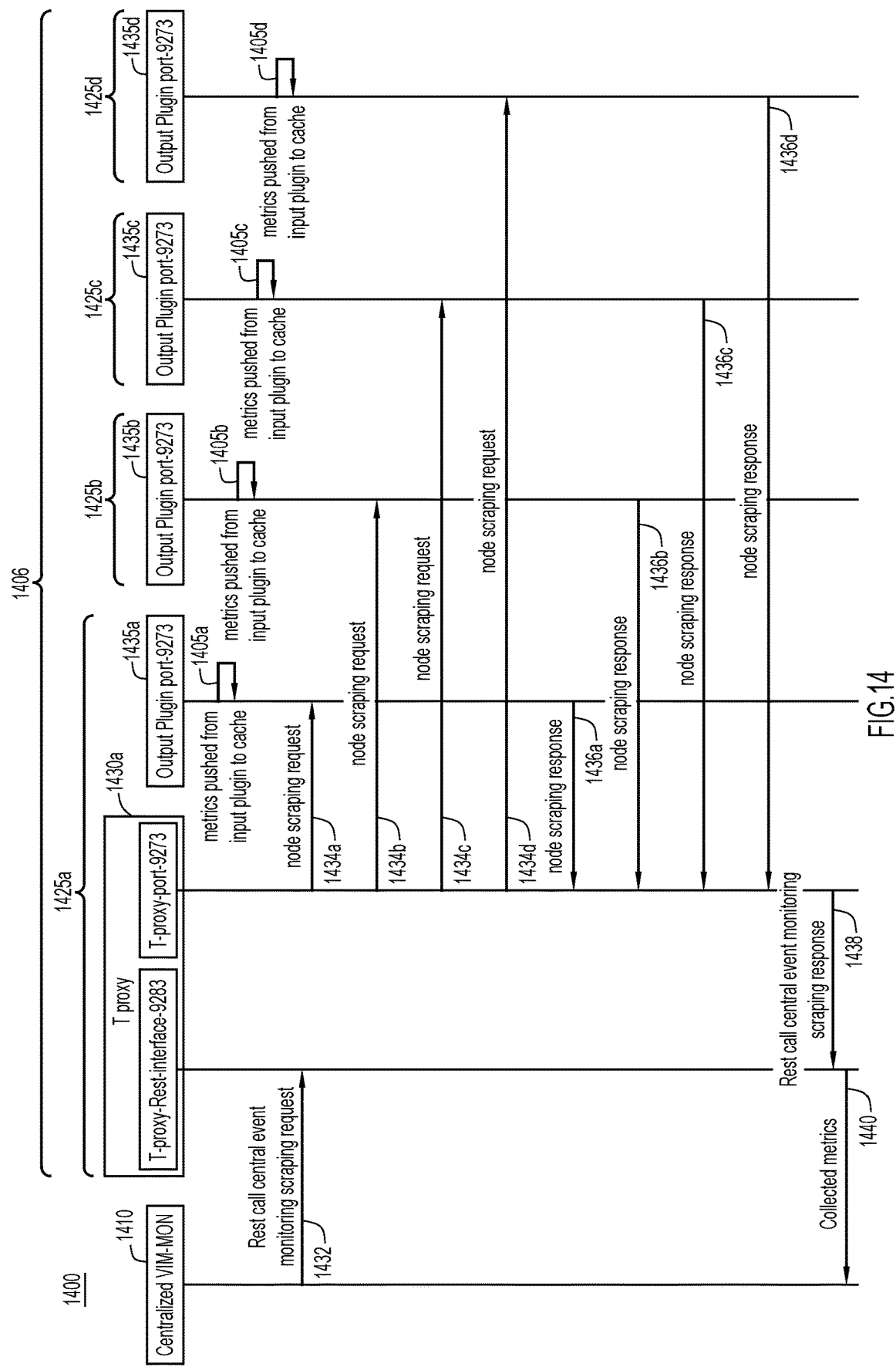
FIG. 14 a call flow diagram illustrating a method of scraping metrics from various locations using VIM-MON-HA, according to an example embodiment.

With reference now made to FIG. 14, depicted therein is a call flow diagram 1400 illustrating a method of scraping metrics from various locations using VIM-MON-HA, according to an example embodiment. More specifically, call flow diagram 1400 includes operations and message exchanges that take place at and between Centralized VIM-MON 1410 and nodes 1425*a-d* arranged within a POD 1406. The method of call flow diagram 1400 begins in operations 1405*a-d* where metrics are pushed from an input plugin of a POD to the cache of the output plugin. For example, operations 1405*a-d* may be embodied as input plugins 1355*a-k* pushing metrics data to caches 1350*a-d* of FIG. 13. Operation 1432 includes a metrics scraping REST call made from centralized VIM-MON 1410 to the active controller node 1425*a* of POD 1406. In operations 1434*a-d*, controller node T-proxy 1430*a* sends node scraping requests to the output plugins 1435*a-d* of nodes 1425*a-d*, each of which responds with a respective node scraping response of operations 1436*a-d*.

In operation 1438, the T-proxy 1430*a* compiles the node scraping responses of operations 1436*a-d* and provides an event monitoring scraping response in operation 1438 to the output interface of the T-proxy 1430*a*. In operation 1440, the collected metrics are provided to centralized VIM-MON 1410. Once received by centralized VIM-MON 1410, the metrics may be stored in a TSDB, such as TSDB 1370 of FIG. 13. FIG. 14 illustrates a method by which centralized VIM-MON 1410 receives metrics from a single POD within a single metro of a single region, such as from POD 1205*a* of metro 1210*a* within region 1215 of FIG. 12. Because centralized VIM-MON 1410 is centralized, it is configured to receive metrics from other PODs within the same of different metros and the same or different regions. For example, centralized VIM-MON 1220 of FIG. 12 may receive metrics from each of PODs 1205*a-d* using a method analogous to that illustrated in FIG. 14.

Figure 15:
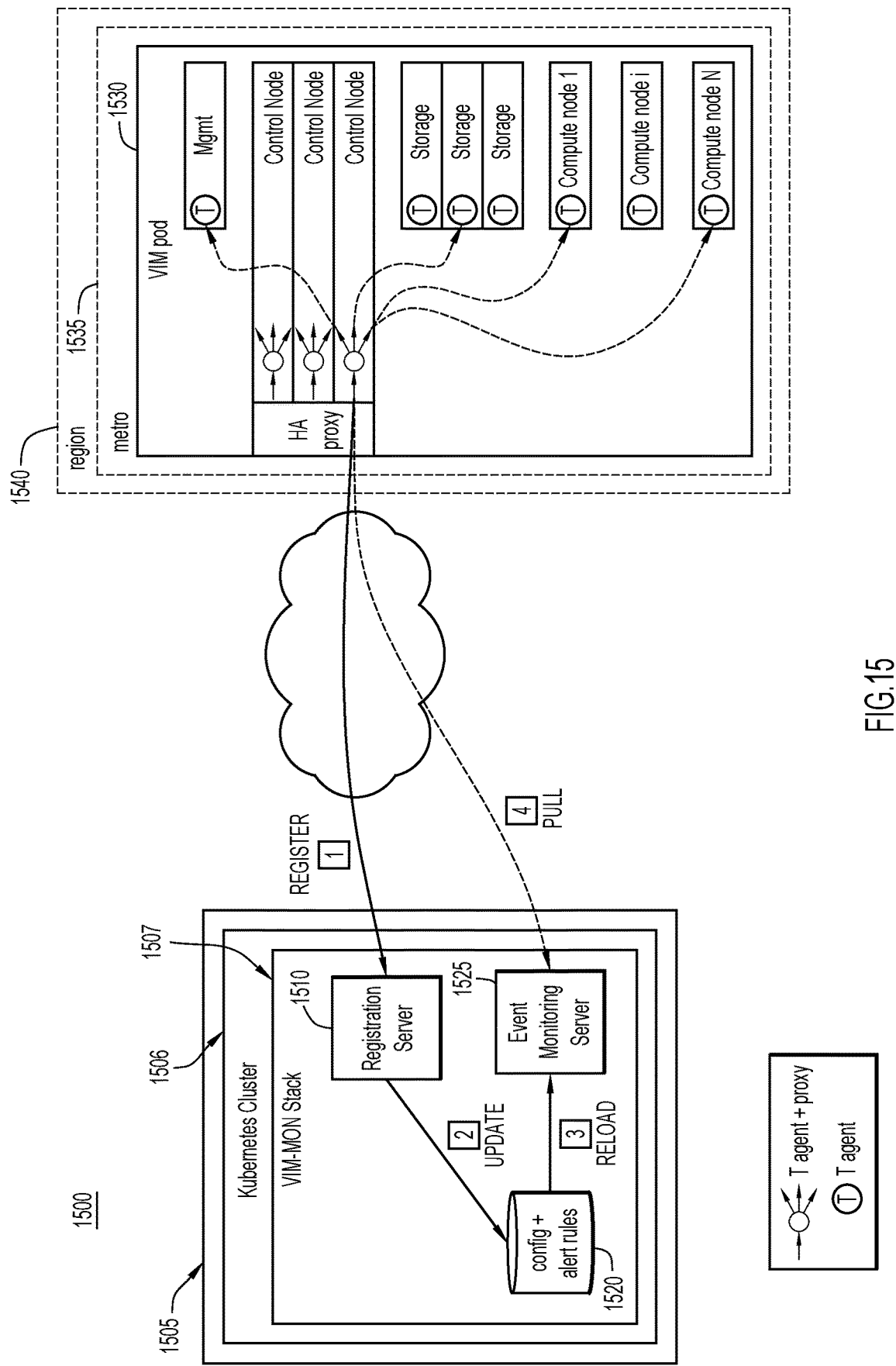
FIG. 15 is a block diagram illustrating a system that includes a VIM-MON stack with a registration server, according to yet another example embodiment.

With reference now made to FIG. 15, depicted therein is a block diagram illustrating a system 1500 that includes a VIM-MON-HA 1505. Included in VIM-MON-HA is a kubernetes cluster 1506, which is analogous to kubernetes cluster 1145 of FIG. 11 and kubernetes cluster 1245 of FIG. 12. Executing with kubernetes cluster 1506 is VIM-MON stack 1507. More specifically, VIM-MON-HA 1505 is a centralized VIM-MON-HA, such as centralized VIM-MON-HA 1110 of FIG. 11 or centralized VIM-MON 1220 of FIG. 12. VIM-MON stack 1507 includes alert rules database 1520, which is analogous to alert rules database 1015 of FIG. 10, and event monitoring server 1525, which is analogous to event monitoring server 1011 of FIG. 11. VIM-MON stack 1507 also includes a registration server 1510. Centralized VIM-MON-HA 1505 is configured to pull metrics data from VIM POD 1530, which is arranged within metro 1535 of region 1540. Because centralized VIM-MON-HA 1505 is centralized, it may also be configured to pull metrics data from other VIM PODs within the same or different metro and/or region as VIM POD 1530.

As shown in FIG. 15, registration server 1510 (running in a kubernetes cluster 1506 in VIM-MON stack 1507) operates with the following workflow:
1. Each monitored VIM POD 1530 registers with the registration server 1510 through a REST interface.
2. The registration server 1510 updates the list of targets in the event monitoring configuration file of event monitoring server 1525 and pushes the new file through a helm update.
3. The event monitoring server 1525 reloads the new configuration file upon detection that the file has changed.
4. The event monitoring server 1525 pulls metrics from the new VIM POD 1530 at a configured interval.

Every VIM POD, including VIM POD 1530 that requires central monitoring has a monitoring registration client that is in charge of interacting with the central registration server 1510 to register itself as a monitoring target and eventually notify of any security credential changes when needed. The registration client may operate as a new plugin in the current metric collecting and reporting proxy agent, inheriting the HA design of the metric collecting and reporting proxy and its VIM configuration workflow, as illustrated in FIG. 13.

The registration server 1510 runs in a container that runs on any node of the kubernetes cluster 1506. It is subject to simple HA (e.g., restart by kubernetes cluster 1506 if registration server 1510 ever goes down). The registration server 1510 may be setup with basic authentication and Transport Layer Security (TLS). The password and certificate files used to implement authentication and TLS are properly set before initializing the registration server 1510 and are configured on the registration client side along with the Uniform Resource Locator (URL) of the registration server 1510.

Figure 16:
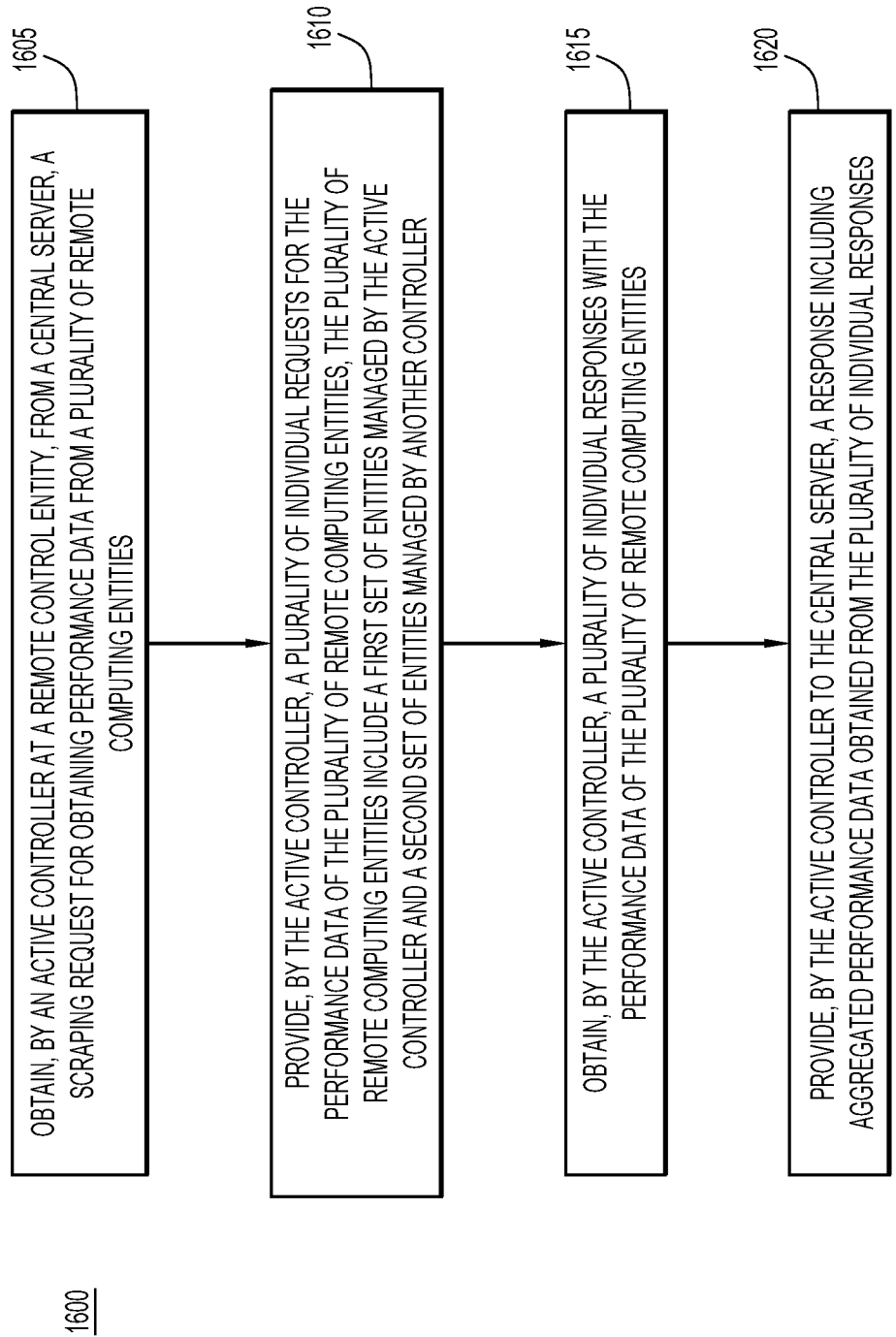
FIG. 16 is a flow diagram illustrating a first method of collecting performance data from various remote computing entities, according to an example embodiment.

With reference now made to FIG. 16, depicted therein is a flowchart 1600 illustrating a first method of collecting performance data from various remote computing entities, according to an example embodiment. The process flow of flowchart 1600 begins in operation 1605 where a scraping request is obtained by an active controller at a remote control entity. The scraping request is configured to request performance data from a plurality of remote computing entities, and the scraping request is obtained by the active controller from a central server. For example, operation 1605 may be embodied as T-proxy 1330*a* obtaining a scraping request from a centralized VIM-MON-HA, as described with reference to FIGS. 13 and 14.

In operation 1610, the active controller provides a plurality of individual requests for the performance data of the plurality of remote computing entities. The plurality of remote computing entities include a first set of entities managed by the active controller and a second set of entities managed by another controller. Operation 1610 may be embodied as the providing of the individual scraping requests from T-proxy 1330*a* of active controller node 1325*a* to the metric collecting and reporting agents 1310*a-d* of nodes 1325*a-d*. Operation 1610 may also be embodied as T-proxy 1430*a* providing individual scraping requests 1434*a-d*, as illustrated in FIG. 14.

In operation 1615, the active controller obtains a plurality of individual responses with the performance data of the plurality of remote computing entities. For example, operation 1615 may be embodied as T-proxy 1330*a* receiving metrics data from event monitoring output plugins 1335*a-d* in FIG. 13 and/or node scraping responses of operations 1436*a-d* of FIG. 14.

Finally, in operation 1620, the active controller provides to the central server a response including aggregated performance data obtained from the plurality of individual responses. Operation 1620 may be embodied as T-proxy 1330*a* providing aggregated metrics data to event monitoring server 1340 as illustrated in FIG. 13 and/or T-proxy 1430*a* providing collected metrics to centralized VIM-MON 1410 through message 1440 as illustrated in FIG. 14.

Figure 17:
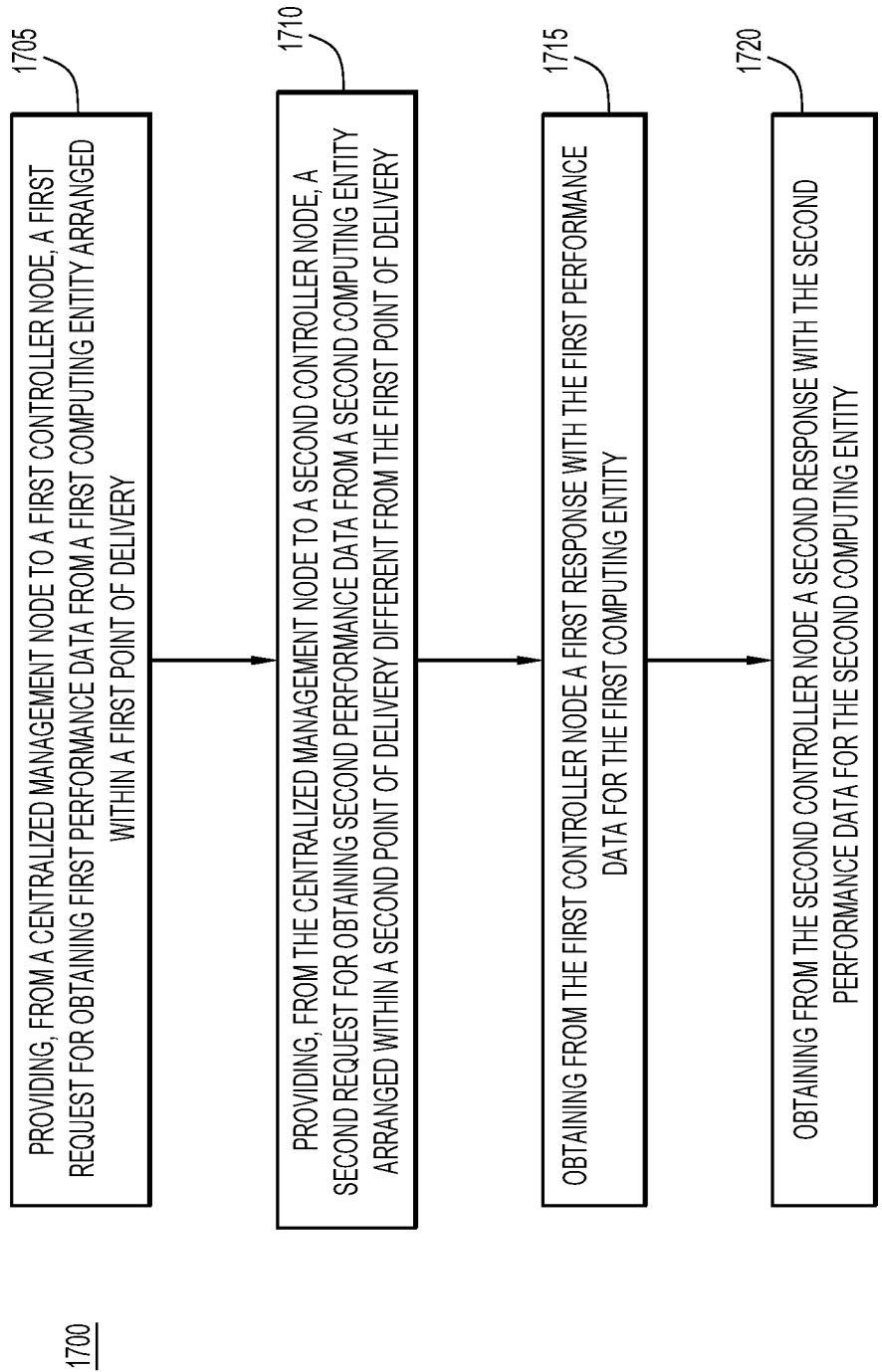
FIG. 17 is a flow diagram illustrating a second method of collecting performance data from various remote computing entities, according to an example embodiment.

With reference now made to FIG. 17, depicted therein is a flowchart 1700 illustrating a second method of collecting performance data from various remote computing entities, according to an example embodiment. The process flow of flowchart 1700 begins in operation 1705 where a first request for obtaining first performance data from a first computing entity arranged within a first point of delivery is provided to a first controller node from a centralized management node. Accordingly, operation 1705 may be embodied as the sending of the message of operation 1432 from centralized VIM-MON 1410 to T-proxy 1430*a*, where T-proxy 1430*a* is arranged within a first POD, as illustrated in FIG. 14.

In operation 1710, a second request for obtaining second performance data from a second computing entity arranged within a second point of delivery is provided to a second controller node from the centralized management node. Accordingly, operation 1710 may be embodied as the sending of the message of operation 1432 from centralized VIM-MON 1410 to T-proxy 1430*a*, where T-proxy 1430*a* is arranged within a second POD, as illustrated in FIG. 14.

In operation 1715, a first response with first performance data for the first computing entity is obtained from the first controller node. Accordingly, operation 1715 may be embodied as the message of operation 1438 sent from T-proxy 1430*a* to centralized VIM-MON 1410 where T-proxy 1430*a* is arranged within a first POD, as illustrated in FIG. 14.

In operation 1720, a second response with second performance data for the second computing entity is obtained from the second controller node. Accordingly, operation 1720 may be embodied as the message of operation 1438 sent from T-proxy 1430*a* to centralized VIM-MON 1410 where T-proxy 1430*a* is arranged within a second POD, as illustrated in FIG. 14.

In summary, the above-described monitoring techniques provide a centralized monitoring solution of centralized VIM-MON-HA that includes an innovative solution for the industry problem of monitoring large scale telco-workloads without compromising on speed and drawbacks of open-source metric collection tools.

Figure 18:
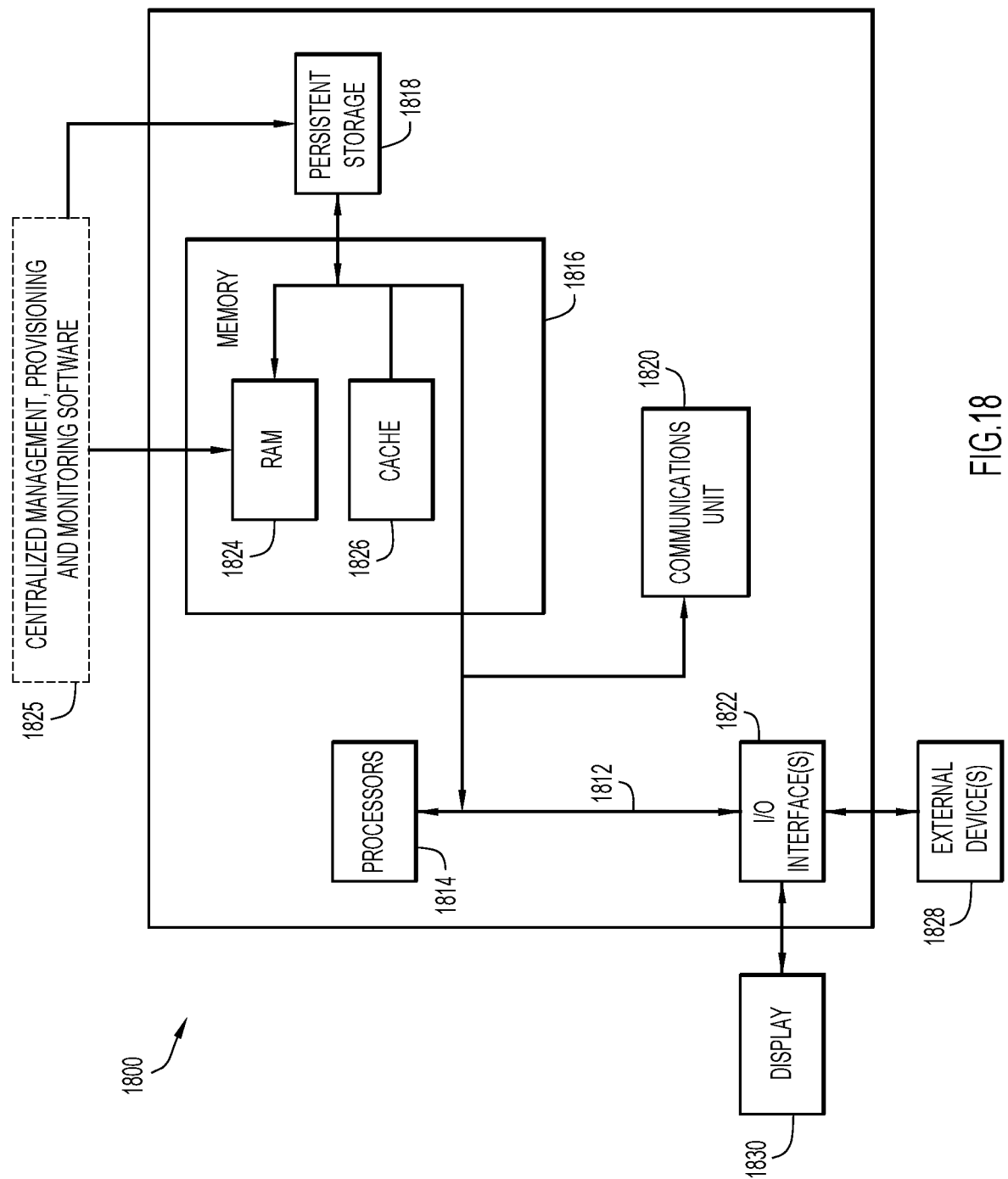
FIG. 18 is a hardware block diagram of a computing device that may perform functions associated with any combination of operations in connection with the techniques depicted in FIGS. 1-17, according to an example embodiment.

With reference now made to FIG. 18, depicted therein is a hardware block diagram of a computing device 1800 that may perform the functions of any of the servers or computing entities referred to herein in connection with FIGS. 1-17. It should be appreciated that FIG. 18 provides only an illustration of one embodiment and does not imply any limitations with regard to the environments in which different embodiments may be implemented. Many modifications to the depicted environment may be made.

As depicted, the device 1800 includes a bus 1812, which provides communications between computer processor(s) 1814, memory 1816, persistent storage 1818, communications unit 1820, and input/output (I/O) interface(s) 1822. Bus 1812 can be implemented with any architecture designed for passing data and/or control information between processors (such as microprocessors, communications and network processors, etc.), system memory, peripheral devices, and any other hardware components within a system. For example, bus 1812 can be implemented with one or more buses.

Memory 1816 and persistent storage 1818 are computer readable storage media. In the depicted embodiment, memory 1816 includes RAM 1824 and cache memory 1826. In general, memory 1816 can include any suitable volatile or non-volatile computer readable storage media. Instructions for the Centralized Management, Provisioning and Monitoring Software 1825 may be stored in memory 1816 or persistent storage 1818 for execution by processor(s) 1814.

One or more programs may be stored in persistent storage 1818 for execution by one or more of the respective computer processors 1814 via one or more memories of memory 1816. The persistent storage 1818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1818 may also be removable. For example, a removable hard drive may be used for persistent storage 1818. Other examples include optical and magnetic disks, thumb drives, and smart cards that are inserted into a drive for transfer onto another computer readable storage medium that is also part of persistent storage 1818.

Communications unit 1820, in these examples, provides for communications with other data processing systems or devices. In these examples, communications unit 1820 includes one or more network interface cards. Communications unit 1820 may provide communications through the use of either or both physical and wireless communications links.

I/O interface(s) 1822 allows for input and output of data with other devices that may be connected to computer device 1800. For example, I/O interface 1822 may provide a connection to external devices 1828 such as a keyboard, keypad, a touch screen, and/or some other suitable input device. External devices 1828 can also include portable computer readable storage media such as database systems, thumb drives, portable optical or magnetic disks, and memory cards.

Software and data used to practice embodiments can be stored on such portable computer readable storage media and can be loaded onto persistent storage 1818 via I/O interface(s) 1822. I/O interface(s) 1822 may also connect to a display 1830. Display 1830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, terms such as "transmit" and "receive" are broadly used herein to refer to techniques for providing and obtaining data in network environments. For example, data may be provided and obtained through packets transmitted and received through networks. Data may also be provided and obtained through data communicated via out-of-band signaling or control channels used in a network environment.

In summary, provided for herein are methods for centralized management and provisioning that include: providing, from a first virtual machine executing on a centralized management node, a first image file to a first computing entity arranged within a first point of delivery, wherein the first image file comprises at least one of a first boot configuration file or a first ramdisk file; providing, from a second virtual machine executing on the centralized management node, a second image file to a second computing entity arranged within a second point of delivery different from the first point of delivery, wherein the second image file comprises at least one of a second boot configuration file or a second ramdisk file; providing, from the first virtual machine executing on the centralized management node, a third image file to the first computing entity arranged within the first point of delivery, wherein the third image file comprises a first operating system installation file; and providing, from the second virtual machine executing on the centralized management node, a fourth image file to the second computing entity arranged within the second point of delivery, wherein the fourth image file comprises a second operating system installation file.

According to certain example embodiments of the disclosed methods, the first point of delivery comprises a first OpenStack point of delivery, and the second point of delivery comprises a second OpenStack point of delivery.

Also according to certain example embodiments of the disclosed methods, the third image file further comprises a first certificate file configured to enable the first compute entity to perform certificate validation of the first operating system installation file.

The first computing entity, according example embodiments of the disclosed methods, comprises at least one of a controller node, a compute node and/or a storage node.

According to other example embodiments of the disclosed methods, the first virtual machine is configured as a first management node for the first point of delivery; and the second virtual machine is configured as a second management node for the second point of delivery.

According to still other example embodiments of the disclosed methods, providing the first image file to the first computing entity arranged within the first point of delivery comprises providing the first image file via a Wide Area Network.

In still other example embodiments of the disclosed methods, providing the first image file to the first computing entity arranged within the first point of delivery comprises providing the first image file via a Local Area Network.

Specific example embodiments of the disclosed methods further include: obtaining, at the centralized management node, a first Dynamic Host Configuration Protocol request, wherein the first image file is provided to the first computing entity in response to obtaining the first Dynamic Host Configuration Protocol request; and obtaining, at the centralized management node, a second Dynamic Host Configuration Protocol request, wherein the second image file is provided to the second computing entity in response to obtaining the second Dynamic Host Configuration Protocol request.

The centralized management and provisioning techniques of the present disclosure also provide for apparatuses. The apparatuses include one or more network interface and one or more processors. The one or more processors are configured to: provide, via the one or more network interfaces from a first virtual machine executing via the one or more processors, a first image file to a first computing entity arranged within a first point of delivery, wherein the first image file comprises at least one of a first boot configuration file or a first ramdisk file; provide, via the one or more network interfaces from a second virtual machine executing via the one or more processors, a second image file to a second computing entity arranged within a second point of delivery different from the first point of delivery, wherein the second image file comprises at least one of a second boot configuration file or a second ramdisk file; provide, via the one or more network interfaces from the first virtual machine executing via the one or more processors, a third image file to the first computing entity arranged within the first point of delivery, wherein the third image file comprises a first operating system installation file; and provide, via the one or more network interfaces from the second virtual machine executing via the one or more processors, a fourth image file to the second computing entity arranged within the second point of delivery, wherein the fourth image file comprises a second operating system installation file.

According to specific example embodiments of the disclosed apparatuses, the first point of delivery comprises a first OpenStack point of delivery; and the second point of delivery comprises a second OpenStack point of delivery.

According to other example embodiments of the disclosed apparatuses, the third image file further comprises a first certificate file configured to enable the first computing entity to perform certificate validation of the first operating system installation file.

According to still other example embodiments of the disclosed apparatuses, the first computing entity comprises at least one of a controller node, a compute node and/or a storage node.

The first virtual machine, according to specific example embodiments of the disclosed apparatuses, is configured as a first management node for the first point of delivery; and the second virtual machine is configured as a second management node for the second point of delivery.

According to still other example embodiments of the disclosed apparatuses, the one or more processors are configured to provide the first image file to the first computing entity arranged within the first point of delivery by providing the first image file via a Wide Area Network.

Also according to the management and provisioning techniques of the present disclosure are one or more tangible, non-transitory computer readable mediums. The one or more computer readable mediums are encoded with instructions, which when executed by one or more processors, are operable to: provide, from a first virtual machine executing on a centralized management node, a first image file to a first computing entity arranged within a first point of delivery, wherein the first image file comprises at least one of a first boot configuration file or a first ramdisk file; provide, from a second virtual machine executing on the centralized management node, a second image file to a second computing entity arranged within a second point of delivery different from the first point of delivery, wherein the second image file comprises at least one of a second boot configuration file or a second ramdisk file; provide, from the first virtual machine executing on the centralized management node, a third image file to the first computing entity arranged within the first point of delivery, wherein the third image file comprises a first operating system installation file; and provide, from the second virtual machine executing on the centralized management node, a fourth image file to the second computing entity arranged within the second point of delivery, wherein the fourth image file comprises a second operating system installation file.

According to specific example embodiments of the disclosed one or more tangible, non-transitory computer readable mediums, the first point of delivery comprises a first OpenStack point of delivery; and the second point of delivery comprises a second OpenStack point of delivery.

According to specific example embodiments of the disclosed one or more tangible, non-transitory computer readable mediums, the third image file further comprises a first certificate file configured to enable the first compute entity to perform certificate validation of the first operating system installation file.

The first computing entity, according to specific example embodiments of the disclosed one or more tangible, non-transitory computer readable mediums, comprises at least one of a controller node, a compute node and/or a storage node.

According still other example embodiments of disclosed one or more tangible, non-transitory computer readable mediums, the first virtual machine is configured as a first management node for the first point of delivery; and the second virtual machine is configured as a second management node for the second point of delivery.

According to additional example embodiments of the one or more tangible, non-transitory computer readable mediums, the instructions operable to provide the first image file to the first computing entity arranged within the first point of delivery are further operable to provide the first image file via a Wide Area Network.

According to the centralized management techniques of the present disclosure are methods that include: providing, from a centralized management node to a first controller node, a first request for obtaining first performance data from a first computing entity arranged within a first point of delivery; providing, from the centralized management node to a second controller node, a second request for obtaining second performance data from a second computing entity arranged within a second point of delivery different from the first point of delivery; obtaining from the first controller node a first response with the first performance data for the first computing entity; and obtaining from the second controller node a second response with the second performance data for the second computing entity.

According to specific example embodiment of the disclosed methods, the first point of delivery comprises a first OpenStack point of delivery; and the second point of delivery comprises a second OpenStack point of delivery.

According to other example embodiments of the disclosed methods, obtaining the first response with the first performance data for the first computing entity comprises receiving the first performance data from a first active controller node of the first point of delivery, wherein the first point of delivery comprises the first active controller node and a first standby controller node; and wherein obtaining the second response with the second performance data for the second computing entity comprises receiving the second performance data from a second active controller node of the second point of delivery, wherein the second point of delivery comprises the second active controller node and a second standby controller node.

According to still other example embodiments of the disclosed methods, the first computing entity comprises the first controller node.

The first computing entity, according to specific example embodiments of the disclosed methods, may comprise at least one of a standby controller node, a compute node and/or a storage node.

In still other example embodiments, the disclosed methods may further comprise providing, from the centralized management node, a third request for obtaining third performance data from the first computing entity arranged within the first point of delivery; and obtaining from a third controller node a third response with the third performance data for the first computing entity, wherein the third performance data is received from the third controller node in response to a failure of the first controller node.

According to other example embodiments of the disclosed methods, providing the first request for obtaining the first performance data from the first computing entity arranged within the first point of delivery comprises providing the first request for obtaining the first performance data for a plurality of computing entities arranged within the first point of delivery.

The centralized monitoring techniques of the present disclosure also provide for apparatuses. The apparatuses include one or more network interface and one or more processors. The one or more processors are configured to: provide, via the one or more network interfaces to a first controller node, a first request for obtaining first performance data from a first computing entity arranged within a first point of delivery; provide, via the one or more network interfaces to a second controller node, a second request for obtaining second performance data from a second computing entity arranged within a second point of delivery different from the first point of delivery; obtain, via the one or more network interfaces from the first controller node, a first response with the first performance data for the first computing entity; and obtain, via the one or more network interfaces from the second controller node, a second response with the second performance data for the second computing entity.

According to specific example embodiments of the disclosed apparatuses, the first point of delivery comprises a first OpenStack point of delivery; and the second point of delivery comprises a second OpenStack point of delivery.

According to other example embodiments of the disclosed apparatuses, the one or more processors are configured to obtain the first response with the first performance data for the first computing entity by receiving the first performance data from a first active controller node of the first point of delivery, wherein the first point of delivery comprises the first active controller node and a first standby controller node; and the one or more processors are configured to obtain the second response with the second performance data for the second computing entity by receiving the second performance data from a second active controller node of the second point of delivery, wherein the second point of delivery comprises the second active controller node and a second standby controller node.

The first computing entity, according to specific example embodiments of the disclosed apparatuses, comprises the first controller node.

According to other example embodiments of the disclosed apparatuses, the first computing entity comprises at least one of a standby controller node, a compute node and/or a storage node.

According to additional example embodiments of the disclosed apparatuses, the one or more processors are further configured to: provide, via the one or more network interfaces, a third request for obtaining third performance data from the first computing entity arranged within the first point of delivery; and obtain, via the one or more network interfaces from a third controller node, a third response with the third performance data for the first computing entity, wherein the third performance data is received from the third controller node in response to a failure of the first controller node.

According to further additional example embodiments of the disclosed apparatuses, the one or more processors are configured to provide the first request for obtaining the first performance data from the first computing entity arranged within the first point of delivery by providing the first request for obtaining the first performance data for a plurality of computing entities arranged within the first point of delivery.

Also according to the centralized monitoring techniques of the present disclosure are one or more tangible, non-transitory computer readable mediums. The one or more computer readable mediums are encoded with instructions, which when executed by one or more processors, are operable to: provide, from a centralized management node to a first controller node, a first request for obtaining first performance data from a first computing entity arranged within a first point of delivery; provide, from the centralized management node to a second controller node, a second request for obtaining second performance data from a second computing entity arranged within a second point of delivery different from the first point of delivery; obtain from the first controller node a first response with the first performance data for the first computing entity; and obtain from the second controller node a second response with the second performance data for the second computing entity.

According to other example embodiments of the disclosed one or more tangible, non-transitory computer readable mediums, the first point of delivery comprises a first OpenStack point of delivery; and the second point of delivery comprises a second OpenStack point of delivery.

According to still other example embodiments of the disclosed one or more tangible, non-transitory computer readable mediums, the instructions operable to obtain the first response with the first performance data for the first computing entity are operable to receive the first performance data from a first active controller node of the first point of delivery, wherein the first point of delivery comprises the first active controller node and a first standby controller node; and the instructions operable to obtain the second response with the second performance data for the second computing entity are operable to receive the second performance data from a second active controller node of the second point of delivery, wherein the second point of delivery comprises the second active controller node and a second standby controller node.

The first computing entity, according to specific example embodiments of the disclosed one or more tangible, non-transitory computer readable mediums, comprises the first controller node.

According to additional example embodiments of the disclosed one or more tangible, non-transitory computer readable mediums, the first computing entity comprises at least one of a standby controller node, a compute node and/or a storage node.

In further additional example embodiments of the disclosed one or more tangible, non-transitory computer readable mediums, the instructions operable to provide the first request for obtaining the first performance data from the first computing entity arranged within the first point of delivery are operable to provide the first request for obtaining the first performance data for a plurality of computing entities arranged within the first point of delivery.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
   establishing, at a centralized data center, a centralized management node configured to provision boot images to points of delivery in a plurality of data centers, wherein each of the points of delivery is configured with a controller node, a compute node and a storage node to provide a repeatable cloud infrastructure element, and wherein each of the plurality of data centers does not include a management node dedicated to provisioning boot images to points of delivery within the data center;
   launching, at the centralized data center, a first virtual machine that is configured as a first management node for a first point of delivery, and a second virtual machine that is configured as a second management node for a second point of delivery;
   obtaining, at the centralized management node, a first Dynamic Host Configuration Protocol request from the first point of delivery and a second Dynamic Host Configuration Protocol request from the second point of delivery;
   in response to the first Dynamic Host Configuration Protocol request, providing, from the first virtual machine executing on the centralized management node, a first image file to a first computing entity arranged within the first point of delivery of a first data center of the plurality of data centers wherein the first image file comprises at least one of a first boot configuration file or a first ramdisk file;
   in response to the second Dynamic Host Configuration Protocol request, providing, from the second virtual machine executing on the centralized management node, a second image file to a second computing entity arranged within the second point of delivery of a second data center of the plurality of data centers, wherein the second image file comprises at least one of a second boot configuration file or a second ramdisk file;
   in response to providing the first image file, obtaining, at the centralized management node, a first chainloading request from the first point of delivery;
   in response to providing the second image file, obtaining, at the centralized management node, a second chainloading request from the second point of delivery;
   in response to obtaining the first chainloading request, providing, from the first virtual machine executing on the centralized management node, a third image file to the first computing entity, wherein the third image file comprises a first operating system installation file, a first kickstart file, and one or more first bash files to provision a first boot image to the first point of delivery; and
   in response to obtaining the second chainloading request, providing, from the second virtual machine executing on the centralized management node, a fourth image file to the second computing entity, wherein the fourth image file comprises a second operating system installation file, a second kickstart file, and one or more second bash files to provision a second boot image to the second point of delivery.

2. The method of claim 1, wherein the first point of delivery comprises a first OpenStack point of delivery; and wherein the second point of delivery comprises a second OpenStack point of delivery.

3. The method of claim 1, wherein the third image file further comprises a first certificate file configured to enable the first computing entity to perform certificate validation of the first operating system installation file.

4. The method of claim 1, wherein providing the first image file to the first computing entity comprises providing the first image file via a Wide Area Network.

5. The method of claim 1, wherein providing the first image file to the first computing entity comprises providing the first image file via a Local Area Network.

6. The method of claim 1, further comprising:
   providing, from the centralized management node to a controller node of the first point of delivery, a first request for performance data from a first computing entity arranged within the first point of delivery; and
   obtaining from the controller node of the first point of delivery a response with the performance data.

7. An apparatus comprising:
   one or more network interfaces; and
   one or more processors, wherein the one or more processors are configured to perform operations on behalf of a centralized management node arranged at a centralized data center and configured to provision boot images to points of delivery in a plurality of data centers, wherein each of the points of delivery is configured with a controller node, a compute node and a storage node to provide a repeatable cloud infrastructure element, and wherein each of the plurality of data centers does not include a management node dedicated to provisioning boot images to points of delivery within the data center, the operations comprising:
- launching, at the centralized data center, a first virtual machine that is configured as a first management node for a first point of delivery, and a second virtual machine that is configured as a second management node for a second point of delivery;
- obtaining, at the centralized management node, a first Dynamic Host Configuration Protocol request from the first point of delivery and a second Dynamic Host Configuration Protocol request from the second point of delivery;
- in response to the first Dynamic Host Configuration Protocol request, providing, via the one or more network interfaces from the first virtual machine executing via the one or more processors, a first image file to a first computing entity arranged within the first point of delivery of a first data center of the plurality of data centers, wherein the first image file comprises at least one of a first boot configuration file or a first ramdisk file;
- in response to the second Dynamic Host Configuration Protocol request, providing, via the one or more network interfaces from the second virtual machine executing via the one or more processors, a second image file to a second computing entity arranged within the second point of delivery of a second data enter of the plurality of data centers, wherein the second image file comprises at least one of a second boot configuration file or a second ramdisk file;
- in response to providing the first image file, obtaining, at the centralized management node, a first chainloading request from the first point of delivery;
- in response to providing the second image file, obtaining, at the centralized management node, a second chainloading request from the second point of delivery;
- in response to obtaining the first chainloading request, providing, via the one or more network interfaces from the first virtual machine executing via the one or more processors, a third image file to the first computing entity, wherein the third image file comprises a first operating system installation file, a first kickstart file, and one or more first bash files to provision a first boot image to the first point of delivery; and
- in response to obtaining the second chainloading request, providing, via the one or more network interfaces from the second virtual machine executing via the one or more processors, a fourth image file to the second computing entity, wherein the fourth image file comprises a second operating system installation file, a second kickstart file, and one or more second bash files to provision a second boot image to the second point of delivery.

8. The apparatus of claim 7, wherein the first point of delivery comprises a first OpenStack point of delivery; and wherein the second point of delivery comprises a second OpenStack point of delivery.

9. The apparatus of claim 7, wherein the third image file further comprises a first certificate file configured to enable the first computing entity to perform certificate validation of the first operating system installation file.

10. The apparatus of claim 7, wherein the operations further comprise providing the first image file to the first computing entity via a Wide Area Network.

11. The apparatus of claim 7, wherein the operations comprise:
- providing, from the centralized management node to a controller node of the first point of delivery via the one or more network interfaces, a first request for performance data from a first computing entity arranged within the first point of delivery; and
- obtaining, from the controller node of the first point of delivery via the one or more network interfaces, a response with the performance data.

12. The apparatus of claim 7, wherein the operations further comprise providing the first image file to the first computing entity via a Local Area Network.

13. One or more tangible, non-transitory computer readable mediums encoded with instructions, wherein the instructions, when executed by one or more processors, are operable to:
- establish, at a centralized data center, a centralized management node configured to provision boot images to points of delivery in a plurality of data centers, wherein each of the points of delivery is configured with a controller node, a compute node and a storage node to provide a repeatable cloud infrastructure element, and wherein each of the plurality of data centers does not include a management node dedicated to provisioning boot images to points of delivery within the data center;
- launch, at the centralized data center, a first virtual machine that is configured as a first management node for a first point of delivery, and a second virtual machine that is configured as a second management node for a second point of delivery;
- obtain, at the centralized management node, a first Dynamic Host Configuration Protocol request from the first point of delivery and a second Dynamic Host Configuration Protocol request from the second point of delivery;
- in response to the first Dynamic Host Configuration Protocol request, provide, from the first virtual machine executing on the centralized management node, a first image file to a first computing entity arranged within the first point of delivery of a first data center of the plurality of data centers, wherein the first image file comprises at least one of a first boot configuration file or a first ramdisk file;
- in response to the second Dynamic Host Configuration Protocol request, provide, from the second virtual machine executing on the centralized management node, a second image file to a second computing entity arranged within the second point of delivery of a second data center of the plurality of data centers, wherein the second image file comprises at least one of a second boot configuration file or a second ramdisk file;
- in response to providing the first image file, obtain, at the centralized management node, a first chainloading request from the first point of delivery;
- in response to providing the second image file, obtain, at the centralized management node, a second chainloading request from the second point of delivery;

in response to obtaining the first chainloading request, provide, from the first virtual machine executing on the centralized management node, a third image file to the first computing entity, wherein the third image file comprises a first operating system installation file, a first kickstart file, and one or more first bash files to provision a first boot image to the first point of delivery; and in response to obtaining the second chainloading request, provide, from the second virtual machine executing on the centralized management node, a fourth image file to the second computing entity, wherein the fourth image file comprises a second operating system installation file, a second kickstart file, and one or more second bash files to provision a second boot image to the second point of delivery.

14. The one or more tangible, non-transitory computer readable mediums of claim 13, wherein the first point of delivery comprises a first OpenStack point of delivery; and
wherein the second point of delivery comprises a second OpenStack point of delivery.

15. The one or more tangible, non-transitory computer readable mediums of claim 13, wherein the third image file further comprises a first certificate file configured to enable the first computing entity to perform certificate validation of the first operating system installation file.

16. The one or more tangible, non-transitory computer readable mediums of claim 13, wherein the instructions are further operable to:
provide, from the centralized management node to a controller node of the first point of delivery, a first request for performance data from a first computing entity arranged within the first point of delivery; and
obtain from the controller node of the first point of delivery a response with the performance data.

17. The one or more tangible, non-transitory computer readable mediums of claim 13, wherein the instructions operable to provide the first image file to the first computing entity comprise instructions operable to provide the first image file via a Wide Area Network.

18. The one or more tangible, non-transitory computer readable mediums of claim 13, wherein the instructions operable to provide the first image file to the first computing entity comprise instructions operable to provide the first image file via a Local Area Network.

* * * * *